(12) United States Patent
Wischnewskiy et al.

(10) Patent No.: US 10,312,831 B2
(45) Date of Patent: Jun. 4, 2019

(54) METHOD FOR CONTROLLING AN ULTRASOUND MOTOR AND CORRESPONDING CONTROL ARRANGEMENT

(71) Applicant: Physik Instrumente (PI) GmbH & Co. KG, Karlsruhe (DE)

(72) Inventors: Wladimir Wischnewskiy, Rathenow (DE); Alexej Wischnewski, Wörth (DE)

(73) Assignee: Physik Instrumente (PI) GMBH & Co. KG, Karlsruhe (DE)

( * ) Notice: Subject to any disclaimer, the term of this patent is extended or adjusted under 35 U.S.C. 154(b) by 0 days.

(21) Appl. No.: 15/557,642

(22) PCT Filed: Mar. 31, 2016

(86) PCT No.: PCT/EP2016/000538
§ 371 (c)(1),
(2) Date: Mar. 13, 2018

(87) PCT Pub. No.: WO2016/155882
PCT Pub. Date: Oct. 6, 2016

(65) Prior Publication Data
US 2018/0183354 A1    Jun. 28, 2018

(30) Foreign Application Priority Data
Mar. 31, 2015    (DE) .................. 10 2015 004 208

(51) Int. Cl.
*H02N 2/00* (2006.01)
*H02N 2/06* (2006.01)
(Continued)

(52) U.S. Cl.
CPC ........... *H02N 2/008* (2013.01); *B06B 1/0648* (2013.01); *H02N 2/062* (2013.01); *H02N 2/142* (2013.01)

(58) Field of Classification Search
CPC ...... H02N 2/004; H02N 2/0015; H02N 2/103; H02N 2/142; H02N 2/163; G05F 17/30867; G05F 3/016
See application file for complete search history.

(56) References Cited

U.S. PATENT DOCUMENTS

| 4,742,260 A | * | 5/1988 | Shimizu | ............. | H02N 2/103 310/323.16 |
| 5,739,724 A | * | 4/1998 | Alexandre | ............ | B06B 1/0253 310/316.01 |

(Continued)

FOREIGN PATENT DOCUMENTS

| DE | 102007021338 A1 | 11/2008 |
| EP | 0602635 A1 | 6/1994 |

(Continued)

OTHER PUBLICATIONS

Int'l Preliminarty Report on Patentability (IPRP) for PCT/EP2016/000538, dated Oct. 3, 2017 (9 pages) (English translation).

(Continued)

*Primary Examiner* — Rina I Duda
(74) *Attorney, Agent, or Firm* — The Juhasz Law Firm

(57) ABSTRACT

A method for controlling an ultrasonic motor. From a starting velocity or starting position of the driven element, the method includes adjusting the frequency of the electrical excitation voltage such that it is equal to or close to the mechanical resonance frequency of the ultrasonic actuator; changing the frequency of the electrical excitation voltage using the signal of the velocity sensor or the position sensor towards the anti-resonance frequency of the ultrasonic actuator until an end velocity or an end position of the driven element is reached; and controlling the end velocity or position of the driven element with a predetermined accuracy by means of antiphase frequency change. Also disclosed is a corresponding control arrangement for an ultra- (Continued)

sonic motor having an ultrasonic actuator with at least two acoustic wave generators, a driven element and a generator via a frequency adjustment.

17 Claims, 18 Drawing Sheets

(51) Int. Cl.
*H02N 2/14* (2006.01)
*B06B 1/06* (2006.01)

(56) References Cited

U.S. PATENT DOCUMENTS

| | | | | |
|---|---|---|---|---|
| 6,694,213 | B2* | 2/2004 | Claesson | B23B 29/022 |
| | | | | 409/141 |
| 6,954,022 | B2* | 10/2005 | Kataoka | H02N 2/142 |
| | | | | 310/316.01 |
| 7,157,830 | B2* | 1/2007 | Jansson | H02N 2/0015 |
| | | | | 310/317 |
| 8,604,665 | B2* | 12/2013 | Wischnewskij | H01L 41/083 |
| | | | | 310/317 |
| 8,901,859 | B2* | 12/2014 | Sumioka | H02N 2/163 |
| | | | | 318/116 |
| 2003/0137216 | A1 | 7/2003 | Miguel et al. | |
| 2007/0100870 | A1* | 5/2007 | Jenkins | G06F 17/30867 |
| 2007/0108870 | A1 | 5/2007 | Jenkins | |
| 2013/0278179 | A1* | 10/2013 | Adachi | H02N 2/004 |
| | | | | 318/116 |
| 2014/0292719 | A1* | 10/2014 | Colgate | G06F 3/016 |
| | | | | 345/174 |

FOREIGN PATENT DOCUMENTS

| | | |
|---|---|---|
| EP | 0602635 B1 | 3/1999 |
| EP | 2095441 B1 | 8/2010 |
| JP | 2010252422 A | 11/2010 |
| WO | 08135350 A2 | 11/2008 |

OTHER PUBLICATIONS

International Search Report for PCT/EP2016/000538 with Engl. translation, search dated Jul. 5, 2016 (5 pages).

Written Opinion for PCT/EP2016/000538, dated Jun. 10, 2016 (9 pages).

* cited by examiner

METHOD FOR CONTROLLING AN ULTRASOUND MOTOR AND CORRESPONDING CONTROL ARRANGEMENT

CROSS REFERENCE TO RELATED APPLICATIONS

This application claims priority, under the terms of 35 U.S.C. § 371(c), to PCT/EP2016/000538, filed Mar. 31, 2016 and which is incorporated by reference in its entirety; PCT/EP2016/000538 claims priority to German national application DE 102015004208.4, filed Mar. 31, 2015, which is also incorporated by reference in its entirety.

TECHNICAL FIELD

The disclosure relates to a method for controlling an ultrasonic motor and a corresponding control arrangement. The inventive method and the corresponding control arrangement is provided for ultrasonic motors or for their applications, in which an accurate movement velocity and a high positioning accuracy at extremely low movement velocities are required.

Corresponding applications can be found in the area of microscopy tables or adjustment tables, optical and laser-focusing systems, generally in the field of positioning systems.

A method and an arrangement for controlling ultrasonic motors (e.g. EP 2 095 441 B1, U.S. Pat. No. 8,604,665 B2) are known in which the ultrasonic actuator of the ultrasonic motor operates at its mechanical resonance frequency and in which the velocity control or position control operates by changing the amplitude of the excitation voltage.

The disadvantage of this known method and the corresponding control arrangement is that, at the mechanical resonance frequency, the resistance of the mechanical inductance $L_m$ of the ultrasonic actuator of the ultrasonic motor is compensated by the resistance $C_m$ of its mechanical capacity. This follows from the physical definition of the mechanical resonance of the ultrasonic actuator.

In this compensation, the change in the mechanical resistance of the friction contact, the retroaction of the drive side or the retroaction by the holder of the actuator is the destabilizing main factor for the stability of the movement velocity and for the positioning accuracy of the ultrasonic motor. This is particularly noticeable in the case of low (10 . . . 1 µm/s) and extremely low (0, 1 . . . 10 µm/s) movement velocities.

In case of low velocities of movement of the driven element of the ultrasonic motor, the oscillations of the mechanical resistance of the friction contact can reach values that vary +/−(10 . . . 50)% around the mean value. These oscillations have a direct effect on the oscillations of the movement velocity and accordingly on the positioning accuracy. The velocity oscillations can take values in the range of +/−(10 . . . 50)% and the positioning accuracy is +/−0.1 µm.

In order to achieve maximum stability of the movement velocity and a maximum positioning accuracy, the aim is to reduce the change in the mechanical resistance of the friction contact. This is done by precision machining of the friction rail of the ultrasonic motor and by precision machining of the friction element of the ultrasonic actuator by grinding and polishing.

Since both the friction rail and the friction element are made of extremely hard materials, this significantly complicates the manufacturing technology of ultrasonic motors and makes them more expensive. This also makes the high-precision drive systems equipped with ultrasonic motors and used in devices with low and extremely low velocities of movement more complex and expensive.

This disclosure provides a method for controlling an ultrasonic motor and a control arrangement for an ultrasonic motor, by which a higher stability or greater constancy of the movement velocity and a higher positioning accuracy of the driven element of the ultrasonic motor, especially at low and very low movement velocities is achieved.

The disclosure includes features of the independent claims. Further embodiments are described in dependent claims which respectively refer to the same.

SUMMARY

According to the disclosure, a method for controlling the velocity of movement or the position of a driven element of an ultrasonic motor using the signal of a velocity sensor and/or a position sensor is provided, wherein the ultrasonic motor comprises an ultrasonic actuator with at least two acoustic wave generators, wherein either one of the generators or both generators is or are subjected to an electrical excitation voltage.

The method according to the disclosure comprises particularly the following steps: starting from a starting velocity or starting position of the driven element adjusting the frequency $f_u$ of the electrical excitation voltage such that it is equal to or close to the mechanical resonance frequency $f_{rm}$ of the ultrasonic actuator; changing the frequency $f_u$ of the electrical excitation voltage using the signal of the velocity sensor and/or the position sensor towards the anti-resonance frequency $f_a$ of the ultrasonic actuator until an end velocity or an end position of the driven element is reached; controlling the end velocity or the end position of the driven element with a predetermined accuracy by means of antiphase frequency change.

According to one embodiment of the method according to the disclosure, it is provided that in addition, when the final velocity or the end position of the driven element is reached, the velocity or position of the driven element is controlled or by means of an amplitude controller a voltage is adjusted which excites one of the generators for acoustic waves.

According to one embodiment of the method according to the disclosure, it is provided that the frequency $f_u$ of the electrical excitation voltage is given by an independent electric generator. As an alternative thereto, it can also be provided that the frequency $f_u$ of the electrical excitation voltage is generated with a self-exciting oscillator whose frequency-giving element constitutes a generator for the mechanical deformation of the ultrasonic actuator. In this regard, it can also be provided that the change in the frequency $f_u$ of the electrical excitation voltage is effected by influencing the magnitude of the phase shift within a phase shifter element of the self-exciting oscillator.

According to one embodiment of the method according to the disclosure, it is provided that the self-exciting oscillator operates on the principle of frequency proportional control.

According to one embodiment of the method according to the disclosure, it is provided that a controller for the velocity and/or the position of the driven element operates on the principle of PID frequency control.

In an embodiment of the method, in which the change in the frequency $f_u$ of the electrical excitation voltage is effected by influencing the magnitude of the phase shift within a phase shifter element of the self-exciting oscillator, it can be provided that as signal used by the generator for the mechanical deformation of the ultrasonic actuator a voltage is used which is generated by an electrically non-excited first or second acoustic wave generator or by an additional electrode which is disposed at the ultrasonic actuator or by an additional piezoelectric element which is disposed at the ultrasonic actuator.

According to one embodiment of the method according to the disclosure, it is provided that an electrical excitation voltage of the same frequency is applied to each of the acoustic wave generators. In this case it can be provided that between the excitation voltages applied to the generators (3, 4) there is a phase shift of any angle in the range of zero to +/−180°, and the phase shift angle preferably amounts to +/−90°. As alternative thereto, it can be provided that the amplitude of the excitation voltage applied to one of the acoustic wave generators is controlled by an amplitude controller.

According to a further aspect of the disclosure, there is provided a method, wherein features thereof may also replace features of one or more of the foregoing embodiments, and wherein the method of controlling a driven member of an ultrasonic motor is from a first adjustment state to a second adjustment state and comprising the following steps: (a) in the first actuating state of the driven element, setting the first voltage U1 with a frequency fu at the first generator which is equal to the mechanical resonance frequency of the first generator or in the vicinity of the mechanical resonance frequency of the first generator; (b) changing the frequency fu of the first voltage U1 in a direction in which the total current Iu of the ultrasonic actuator decreases until reaching the second adjustment state of the driven element; and (c) after determining that the driven element has reached the second adjustment state, maintaining the second adjustment state of the driven element stable by a control loop in which a detected deviation of the current setting state from the second adjustment state is reduced by changing one or both of the following measures: (c1) changing the frequency of the first voltage U1 relative to the frequency of the second voltage U2; and (c2) changing the amplitude of the first voltage U1 relative to the amplitude of the second voltage U2.

In these method steps it can be provided that in step (a) the second voltage U2 is constant or the second voltage U2 is adjusted at the same amplitude and frequency fu as the first voltage U1. Furthermore, in these method steps it can be provided that the adjustment state comprises the velocity or the adjustment position of the driven element or both the velocity and the adjustment position of the driven element.

According to a further aspect of the disclosure, a control arrangement for an ultrasonic motor is provided, the ultrasonic motor comprising an ultrasonic actuator with at least two acoustic wave generators, a driven element and a generator for an electrical excitation voltage, wherein the generator for an electrical excitation voltage comprises a frequency adjustment, whose output is connected to a power amplifier and whose input is connected to a controller for the movement velocity or for the position of the driven element According to the disclosure, the ultrasonic actuator can in particular comprise: an ultrasound actuator with at least one group of at least two generators for generating acoustic waves, with an electrical excitation device connected to the two generators for applying a first voltage U1 and a second voltage U2 to each one of the generators, with a friction element located between two generators each of a group of generators and coupled to each of the two generators of each such group for controlling the movement of the friction element by the two generators of the respective group of generators, with a driven element attached to the friction element in order to be driven by the same According to one embodiment of the control arrangement, it can be provided that the control arrangement further comprises an amplitude controller of the electrical excitation voltage, the input of which is connected to controller for the movement velocity or the position of the driven element According to one embodiment of the control arrangement, it can be provided that the same comprises a phase detector whose first input is connected to a generator for the mechanical deformations of the ultrasonic actuator and whose second input is connected to the output of the power amplifier. In this case the control arrangement can be realized such that as generator for the deformation of the actuator an electrically non-excited generator for acoustic waves or an additional electrode or an piezoelectric element which is arranged on the ultrasonic actuator is use According to one embodiment of the control arrangement, it can be provided that for frequency adjustment a controlled phase shifter is used which comprises an electrically controlled resistor, an electrically controlled capacitor or an electrically controlled digital phase shifter.

DETAILED DESCRIPTION

Figure 1:
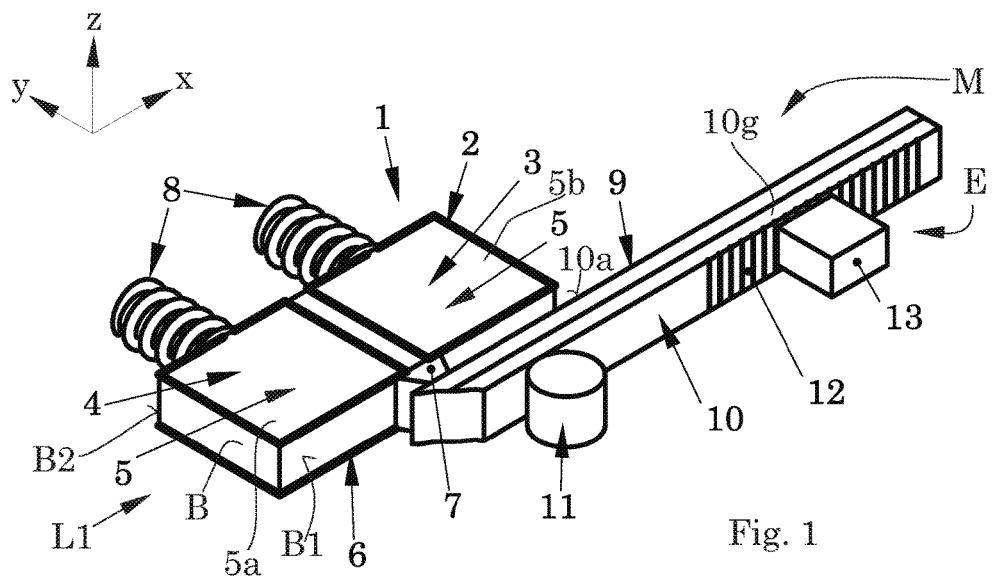
FIG. 1 depicts an embodiment of an ultrasonic motor according to this disclosure.

FIG. 1 shows a possible embodiment for an ultrasonic motor for the application of the method according to the disclosure. The ultrasonic motor M generally comprises: an ultrasonic actuator 1 which comprises: at least one group of in each case two generators 3, 4 for generating sonic waves and in particular ultrasonic waves, with a activation device electrically connected to the generators 3, 4 for applying to each one of the generators 3, 4 a first voltage U1, defined by a respective frequency and respective amplitude, and/or a second voltage U2, defined by a respective frequency and a respective amplitude; a friction element 7 which is located between the generators 3, 4 of a respective group of generators 3, 4 and which is coupled to each of the generators 3, 4 of each such group in order to control the movement of the friction element 7 by the mechanical deformation of the generators 3, 4 of the respective group of generators due to the activation with the first voltage U1 and/or the second voltage U2; a frame device (not shown in the figures) which can be realized as a housing or as a holder and in which the ultrasonic actuator 1 is arranged; a guide device 11 arranged on or in the frame device; a driven element 10 which abuts the friction element 7 in order to be driven by it; a sensor device E for detecting the actuating state of the driven element 10; the activation device, which is functionally coupled to the sensor device E.

The generator, which is designated by the reference numeral "3", is hereinafter also referred to as "first generator" in part. In an analogous manner, the generator, which is designated by the reference symbol "4", will hereinafter also be referred to as "second generator" in part.

The ultrasonic actuator 1 generates in response to an electrical excitation voltage, which may be formed by the first voltage U1 or the second voltage U2 or both by the first voltage and by the second voltage U2, in a unique manner, a predetermined time-dependent deformation of the first generator 3 and of the second generator 4 and in particular of the actuation layer B, and in particular a time-dependent deformation at least on a first longitudinal side surface B1, to which the friction element 7 which is in contact with the driven element 10 is fastened. With the solution according to the disclosure, the friction element 7 displaces the driven element 10 from the first adjustment state (starting velocity and/or starting position) into the second adjustment state (end velocity and/or end position) as a function of the time course of movement of the first longitudinal side surface B1 of the ultrasonic actuator 1.

In particular, each generator 3, 4 may comprise at least one pair of electrodes which are spaced apart to each other and are electrically driven by the activation device and an actuation layer B with the first longitudinal side surface B1 located at or between or at and between the respective pair of electrodes spaced apart to each other so that a predetermined time-dependent deformation of the actuation layer B takes place by applying a first voltage U1 and/or a second voltage U2 to the respective electrode or the respective pair of electrodes. The actuation layer B extends over both generators 3, 4 of the group of two generators 3, 4 in each case. The electrical excitation voltage is generated by an activation device electrically connected to the ultrasonic actuator 1 in order to effect the change in the state of the driven element 10.

In the embodiment of the ultrasonic motor M in which the friction element 7 is disposed on the first longitudinal side surface B1 and between each two generators 3, 4, by predetermined activation of the first generator 3 and/or the second generator 4 in a specific manner, a predetermined deformation of the first longitudinal side surface B1 and thus a predetermined movement of the friction element 7 can be realized The frame device, the ultrasonic actuator 1 and the guide device 11 may be designed and located relative to each other so that the same movably keep the driven member 10 between the friction element 7 of the ultrasonic actuator 1 and the guide device 11. The ultrasonic actuator 1 generates a waveform with a frequency on the longitudinal side surface of the ultrasonic actuator 1 which is adjusted by an activation device, whereby a change in the adjustment state from a first adjustment state to a second adjustment state of the element 10 which lies against the friction element 7 is achieved. The ultrasonic actuator 1 is formed as a piezoelectric element, wherein the piezoelectric element in the embodiment shown in FIG. 1 may be designed as a piezoelectric plate 2, which extends in a longitudinal direction L1 of the piezoelectric plate 2 or the ultrasonic actuator 1. The piezoelectric element can also be designed differently and e.g. be cylindrical, semi-cylindrical or cuboid. The longitudinal direction L1 extends in the direction of an X-axis of a Cartesian coordinate system having the X-axis, a Y-axis defining a transverse direction, and a Z-axis defining a thickness direction The ultrasonic actuator 1 and in particular the piezoelectric plate 2 comprises two generators 3, 4 for generating acoustic waves on the first longitudinal side surface B1 of the ultrasonic actuator 1, against which the driven member 10 lies, for driving the driven member 10. The two generators 3, 4 form the piezoelectric element or the piezoelectric plate 2. The group of generators 3, 4 in the embodiment illustrated in FIG. 1 comprises two excitation electrodes 5, that is to say a first excitation electrode 5a and a second excitation electrode 5b, and a general electrode 6 and an actuation layer B located between the same. In the embodiment of the ultrasonic actuator 1 according to FIG. 1, the first and the second excitation electrodes 5a, 5b are arranged one behind the other as viewed in the longitudinal direction L1, and the actuation layer B extends along the longitudinal direction L1 and along the first and the second excitation electrodes 5a, 5b and the general electrode 6 and between them. Arrows and the index p indicate the respective polarization direction.

The actuation layer B may in particular be formed of a piezoelectric ceramic. The actuation layer B has a first longitudinal side surface B1 and a second longitudinal side surface B2 that are opposed to each other and oriented in a direction that runs along the Y direction, respectively. The longitudinal side surfaces B1, B2 can, as shown in FIG. 1, extend along the longitudinal direction L1. At least one of the longitudinal side surfaces B1, B2 may be a longitudinal side surface of the ultrasonic actuator 1, against which the driven element 10 abuts and on which a waveform with a resonant frequency for driving the driven element 10 can be generated.

The driven element 10 has a drive surface 10a, which is located facing the piezoelectric plate 2 and lies against a contact surface of the friction element 7 which faces the drive surface 10a and lies against the same. The driven member 10 may be formed of a base body 10g and a friction layer 9 whose surface facing the friction member 7 or the piezoelectric plate 2 forms the drive surface 10a. In general, the driven element 10 can be elongated and, as shown in FIG. 1, in particular can have the form of a bar. The driven element 10 is designed by its material or its shape at the drive surface, which faces the friction element 7, or by both of these properties such that the waves which are generated due to the electrical excitation of the ultrasonic actuator 1 in the resonance range of same at the piezoelectric plate 2, are advantageously and efficiently transferred to the driven member 10.

The driven member 10 of the ultrasonic motor M is guided in or on the guide device 11 which is configured such that the driven member 10 is movable along the longitudinal direction L1 relative thereto.

As shown in FIG. 1, the guide device 11 may be formed of a roller which is arranged on the frame device, wherein the roller is rotatably or non-rotatably mounted on the frame device and against which the driven element 10 lies. The guide device 11 can also be formed of a plurality of rollers which are disposed on the frame device and against which the driven element 10 lies. The guide device 11 may e.g. also have the form of a guideway (not shown) which can be attached to or can be part of the frame device and through which the driven element 10 is guided as it moves along the longitudinal direction L1.

The friction element 7 of the ultrasonic motor M is arranged on a longitudinal side surface B1, B2 of the core layer K. In this case, the friction element 7 can be attached to the first or the second longitudinal side surface B1, B2, and e.g. be glued thereon. In the embodiment shown in FIG. 1, the friction element 7 is disposed on the first longitudinal side surface B1, which is oriented in the illustrated embodiment contrary to the Y direction. In this case, as shown in FIG. 1, it can be provided that the friction element 7 is at least partially disposed in a region located between the first excitation electrode 5a and the second excitation electrode 5b when viewed in the longitudinal direction L1.

The friction member 7 comprises a friction surface 75 which faces and lies against the drive surface 10a of the driven member 10, particularly for moving the drive surface 10a of the driven member 10.

The ultrasonic actuator 1 may be fixed in the frame device so that no movement of the ultrasonic actuator 1 in the frame device is permitted. In this case, the frame device and the ultrasonic actuator 1 is designed such that the friction element 7 of the ultrasonic motor M presses against the driven element 10. Alternatively, the ultrasonic actuator 1 may be movably mounted in the frame device, wherein the ultrasonic actuator 1 is mounted so as to be movable transversely to the extension direction of the drive surface 10a of the driven element 10, i.e. along the Y direction. In this embodiment, it is provided that the ultrasonic motor M comprises a biasing device 8, by which the friction element 7 of the ultrasonic actuator 1 is pressed against the drive surface 10a of the driven element 10. The biasing device 8 may, as shown in FIG. 1, be formed by two springs and generally by at least one spring or a spring element. Thus, the friction element 7 is pressed by means of the biasing device 8 to the friction layer 10 of the driven element 10 mounted in the guide device 11.

The ultrasonic motor M furthermore comprises a sensor device E by which the adjustment state, that is to say the velocity of movement and/or the position of the driven element 10, can be detected. The sensor device E can, as shown in FIG. 1, comprise a measurement scale 12 disposed on the driven element 10 and a velocity sensor or position sensor 13, each of which uses the measuring scale 12 to determine the velocity or position of the driven element 10 or both.

Figure 2:
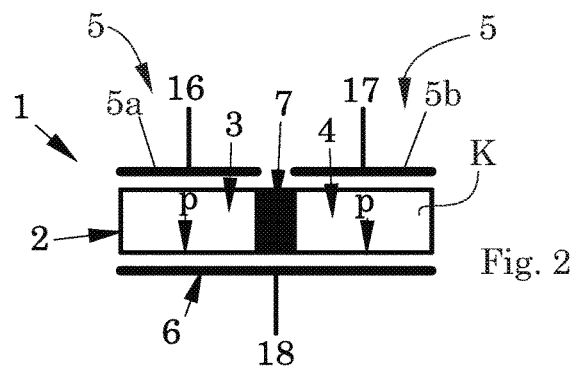
FIGS. 2 and 3 each depict an embodiment of an ultrasonic actuator for the ultrasonic motor of FIG. 1.
Figure 3:
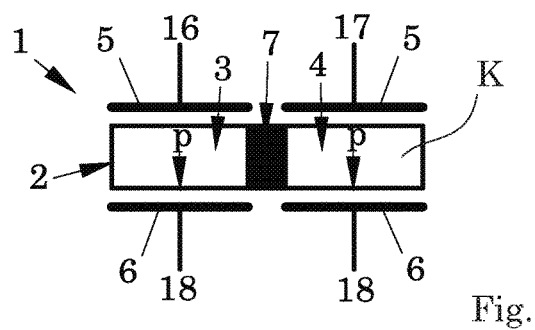

FIGS. 2 and 3 each schematically show an embodiment of an ultrasonic actuator 1 for the ultrasonic motor M according to FIG. 1. According to FIG. 2, the ultrasonic actuator 1 has a general electrode 6, while the ultrasonic actuator according to FIG. 3 has two general electrodes 6. The polarization direction of the piezoceramic of the piezoelement of the ultrasonic actuator 1 is directed normal to the excitation electrodes 5 and the general electrodes 6. In the figures, the polarization direction is indicated by arrows and the index p. The excitation electrodes 5 of the first generators 3 comprise the outputs 16, the excitation electrodes 5 of the second generators 4 comprise the outputs 17, the general electrodes 6 comprise the outputs 18.

Figure 4:
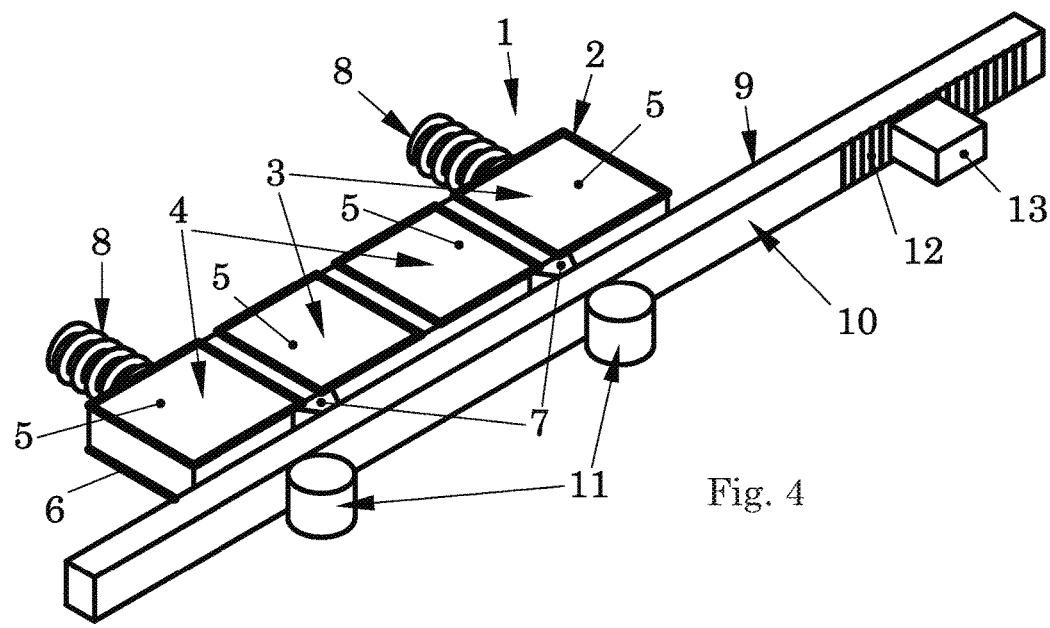
FIG. 4 depicts another embodiment of an ultrasonic motor having an ultrasonic actuator in the form of a dual actuator.

FIG. 4 shows a further possible embodiment of an ultrasonic motor M which has an ultrasonic actuator 1 in the form of a dual actuator. This dual actuator includes two friction elements 7 and two pairs of divided excitation electrodes 5 and general electrodes 6.

Figure 5:
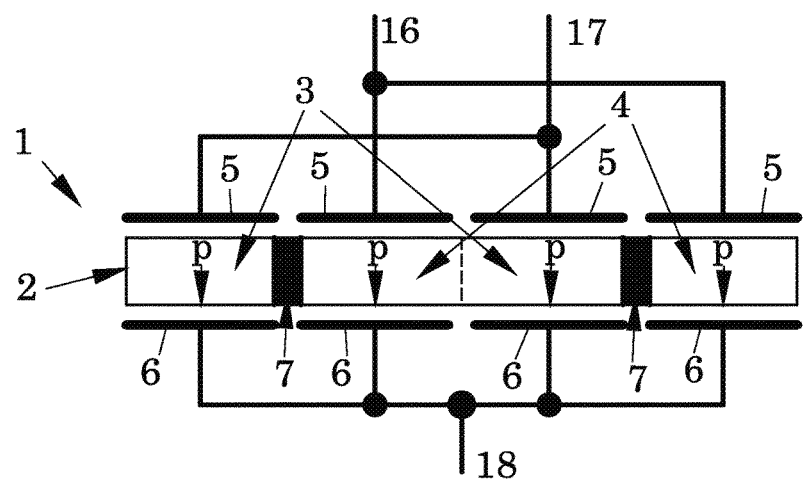
FIG. 5 depicts an electrical connection diagram for the dual actuator according to FIG. 4.

FIG. 5 shows a possible electrical connection diagram for the excitation electrodes 5 and the general electrodes 6 of such a dual actuator.

Figure 6:
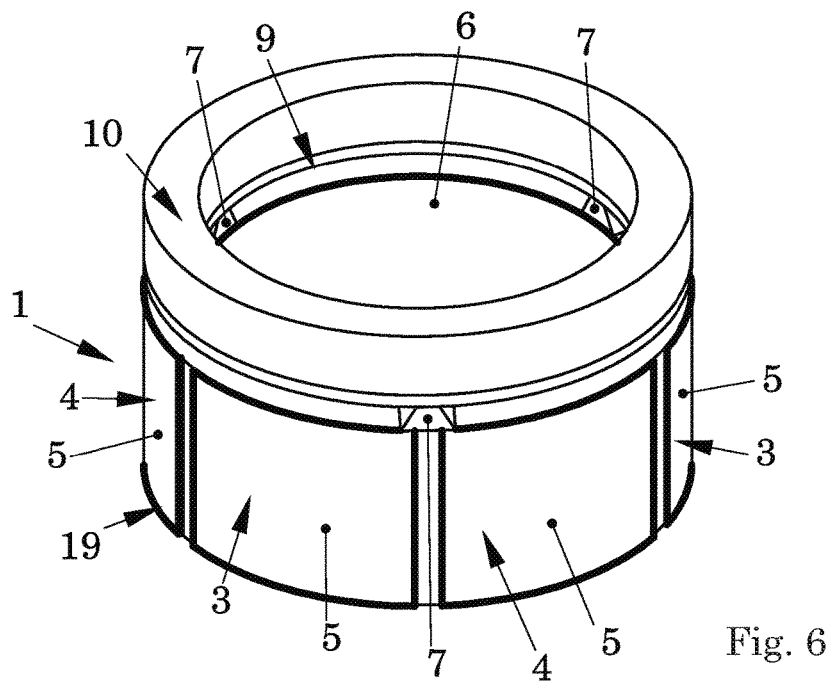
FIG. 6 depicts another embodiment of an ultrasonic motor according to the present disclosure.

FIG. 6 shows a further embodiment for an ultrasonic motor M. This ultrasonic motor M has an ultrasonic actuator 1 in the form of a threefold actuator with three friction elements 7, with three pairs of excitation electrodes 5 and with a general electrode 6. The piezoelectric element of this triple actuator is designed as a piezoelectric cylinder.

Figure 7:
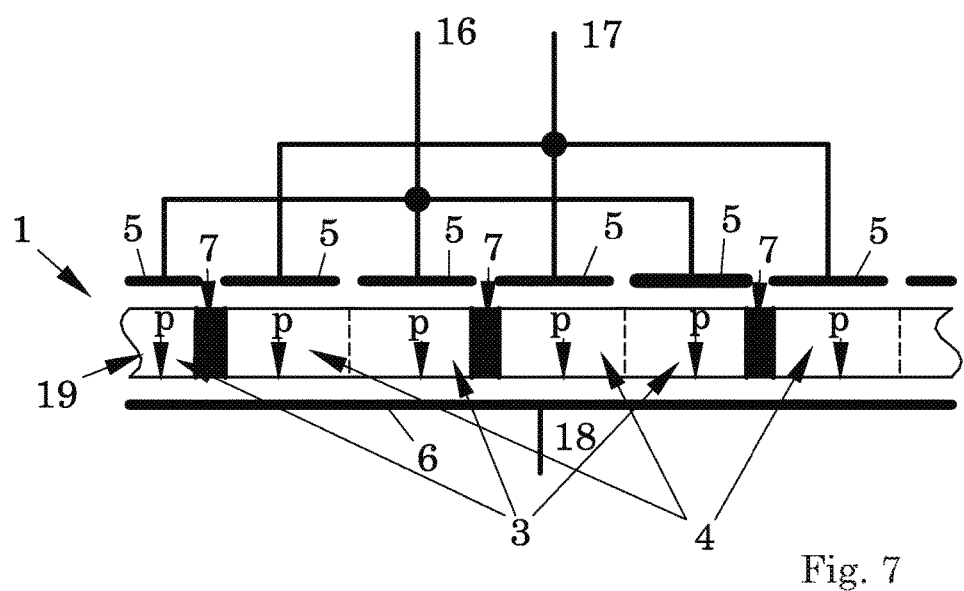
FIG. 7 depicts an electrical connection diagram for the dual actuator according to FIG. 6.

FIG. 7 shows a possible electrical connection diagram for the excitation electrodes 5 of the triple actuator according to FIG. 6.

Figure 8:
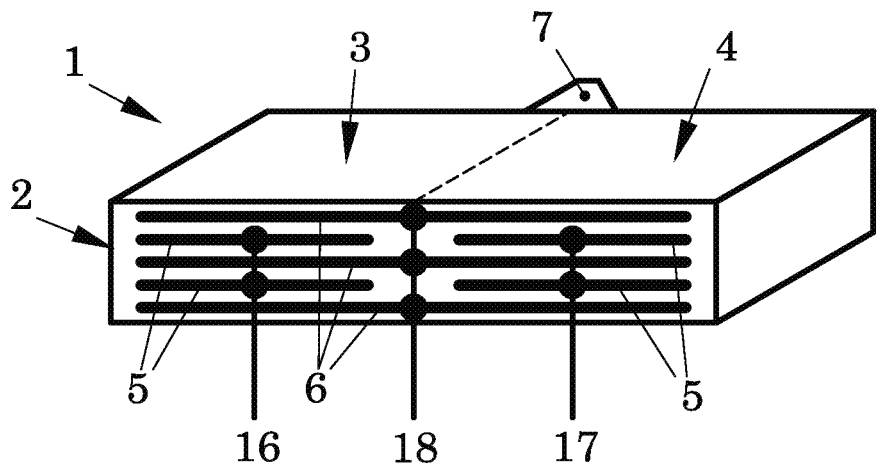
FIG. 8 depicts a different view of the ultrasonic actuator of FIG. 1 in which the piezoelectric element is designed as a piezoelectric plate, and in which the electrodes have a multilayer structure.

FIG. 8 shows an ultrasonic actuator 1 of an ultrasonic motor M whose piezoelectric element is designed as a piezoelectric plate 2 and in which the excitation electrodes 5 and the general electrodes 6 of the first and second generators 3, 4 have a multilayer structure.

Figure 9:
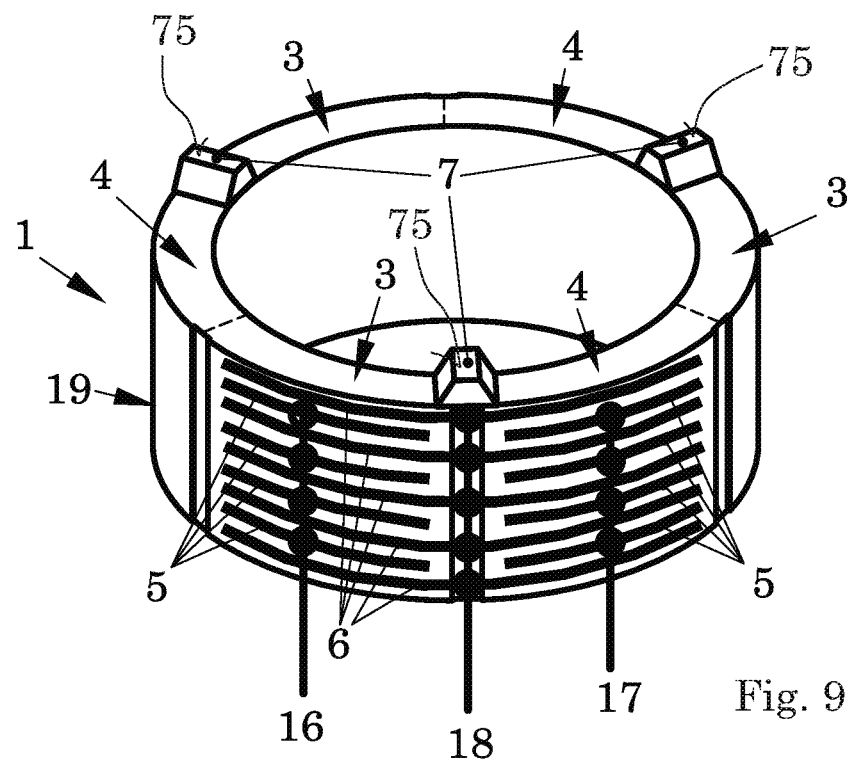
FIG. 9 depicts a different view of the ultrasonic actuator of FIG. 1 in which the piezoelectric element is designed as a piezoelectric ring, and in which the electrodes have a multilayer structure.

FIG. 9 shows an ultrasonic actuator 1 of an ultrasonic motor M whose piezoelectric element is designed as a piezoelectric ring and in which the excitation electrodes 5 and the general electrodes 6 of the first and second generators 3, 4 have a multilayer structure.

Figure 10:
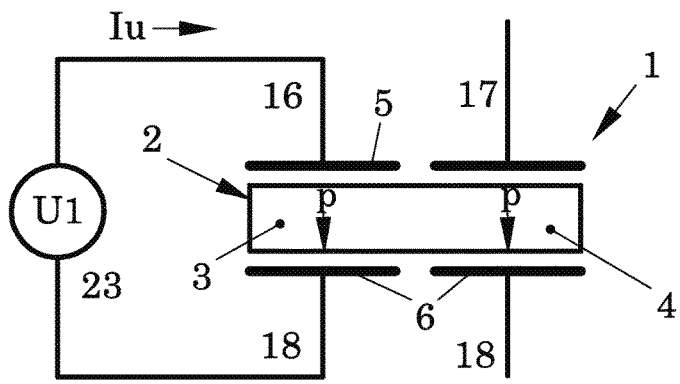
FIG. 10 depicts an electrical connection diagram for an ultrasonic actuator having a single-phase electrical excitation device.

FIG. 10 shows a connection diagram of the ultrasonic actuator 1 with a single-phase electrical excitation device 23. The excitation device 23 provides the first voltage U1 as a voltage of frequency fu.

Figure 11:
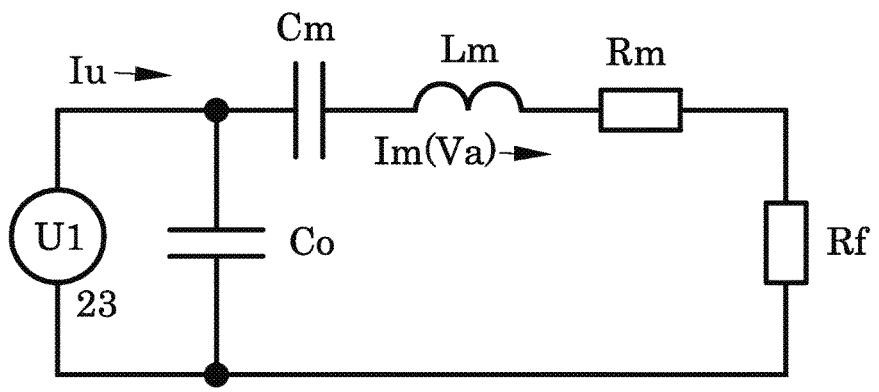
FIG. 11 depicts an electrical model of an ultrasonic actuator according to the present disclosure.

FIG. 11 shows the electrical model of an ultrasonic actuator 1 of an ultrasonic motor according to the disclosure, which is limited to its electrical components. The model contains the electrical capacitance Co, the mechanical capacity Cm, the mechanical inductance Lm, the mechanical loss resistance in the actuator Rm and the mechanical loss resistance in frictional contact of the ultrasonic motor Rf. The current Iu represents the total current flowing through the ultrasonic actuator 1. The current Im is the current flowing through the mechanical part of the ultrasonic actuator 1. The current Im is proportional to the movement velocity Va of the driven element 10 of the ultrasonic motor.

Figure 13:
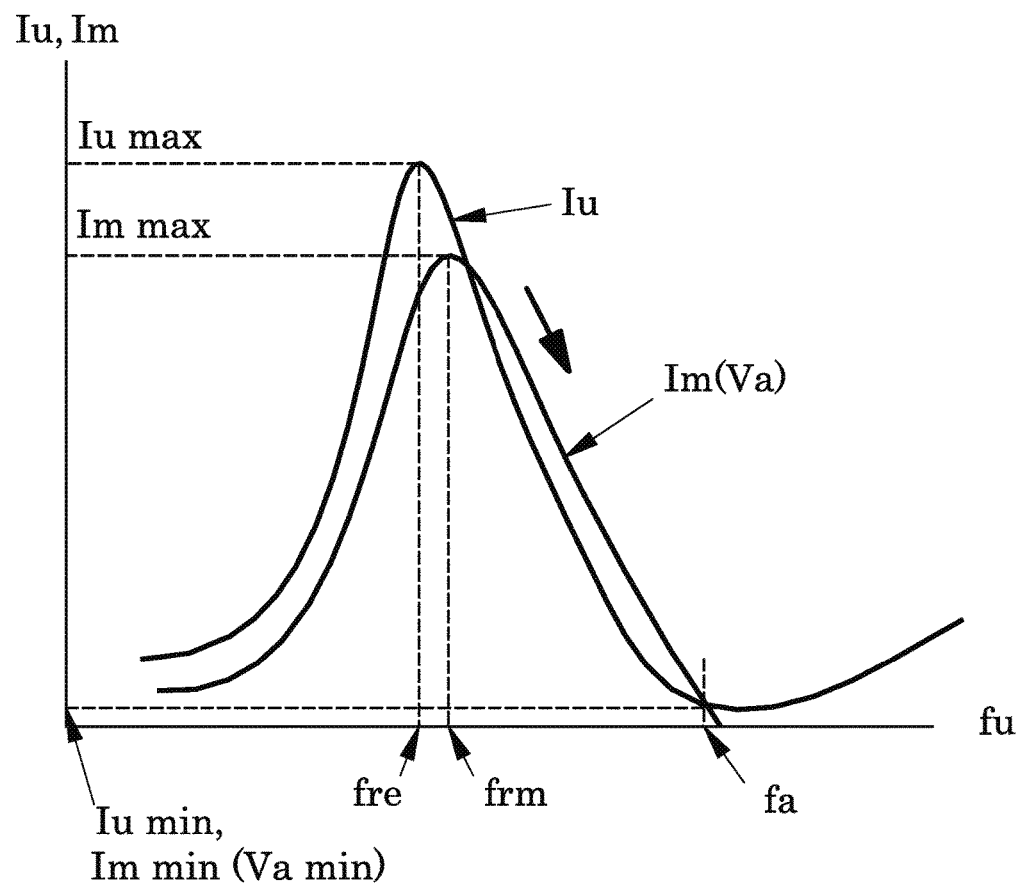
FIG. 13 depicts the dependence of the total and mechanical currents on the frequency of the excitation voltage.

FIG. 13 shows the dependence of the total current Iu and of the mechanical current Im on the frequency fu of the excitation voltage provided by the first voltage U1 for the circuit shown in FIG. 11.

The first dependence has a maximum Iu max at the electrical resonance frequency fe and a minimum Iu min at the anti-resonant electric frequency fa. The second dependence has a maximum Im max at the mechanical resonance frequency frm. The frequencies fe and fr differ only slightly from each other.

Based on the general statements, it can be proved that Cm amounts to about 10 Co and Rf is in the range (10 . . . 100) Rm.

If the frequency fu is equal to the mechanical frequency frm of the ultrasonic actuator 1, then according to the definition of the resonance $2\pi$ fr Lm=1/($2\pi$ fr Cm), i.e. the inductive resistance of the mechanical inductance Lm is compensated at this frequency by the inductive resistance of the capacity Cm. Therefore, in the case of the mechanical resonance frequency frm, the circuit in FIG. 11 can be converted into the circuit shown in presentation 25 of FIG. 12.

Figure 12:
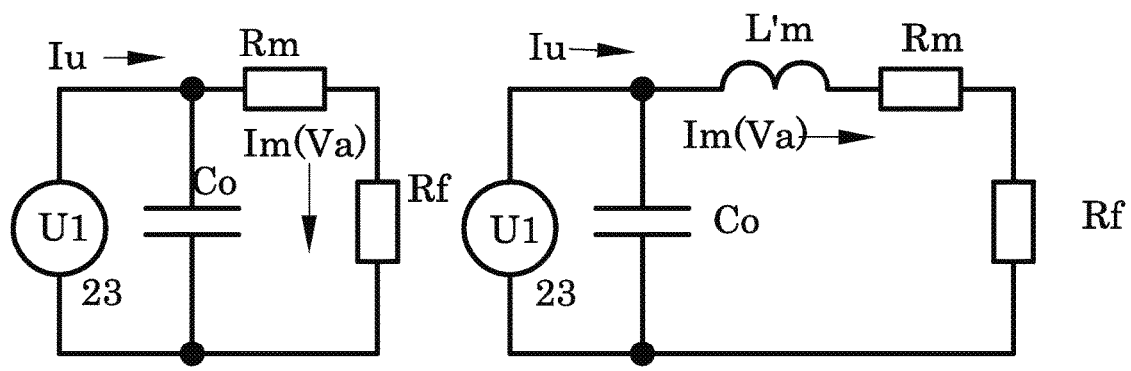
FIG. 12 depicts an alternative to the electrical model of an ultrasonic actuator of FIG. 11.

From the circuit in presentation 25 of FIG. 12 it can be seen that in a motor control according to the known methods and with the known arrangement, in which the frequency fu of the excitation voltage provided by the first voltage U1 is always equal to the mechanical resonance frequency frm, oscillations of the mechanical resistance of the friction contact Rf are caused, which are practically equal to the oscillations of the current Im and the corresponding movement velocity Va of the driven element 10 of the ultrasonic motor M.

This means that with a movement of the driven element 10 and a change in the resistance of the friction contact by +/−10%, the velocity of movement Va of the driven element 10 also changes by +/−10%. If the resistance of the friction contact changes by +/−50% during a movement of the driven element 10, the velocity of movement Va of the driven element 10 also changes by +/−50%. In this case, the oscillations of the velocity Va do not depend on the amplitude level of the excitation voltage provided by the first voltage U1. That is, using the known method and apparatus for controlling an ultrasonic motor at both high and low moving velocities of the driven member 10, the same instability of the moving velocity of the driven member 10 occurs.

In the present disclosure, a control of the velocity of movement of the driven member 10 of the ultrasonic motor is proposed, which is based on a tuning of the frequency fu for the excitation voltage driving the ultrasonic actuator 1, wherein the excitation voltage is provided by the first voltage U1. The frequency tuning takes place on the basis of the mechanical resonance frequency frm in the direction of the antiresonance frequency fa, shown in FIG. 13 with an arrow.

Figure 14:
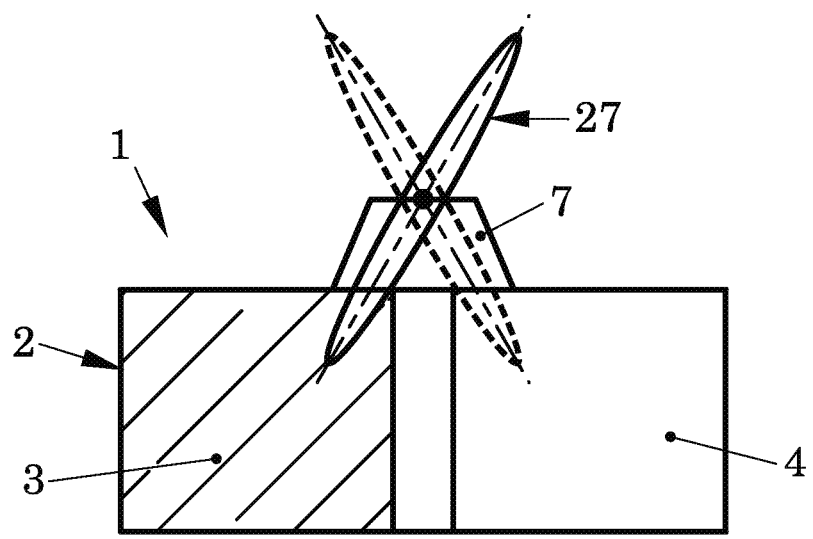
FIG. 14 depicts movement of the friction element of the motor in response to excitation by the first and second generators.

At the mechanical resonance frequency frm, the friction element 7 driven by the first generator 3 moves on an elongated inclined trajectory 27, as shown in FIG. 14. Upon excitation of the second generator 4, the movement path 27 changes its inclination, shown in FIG. 14 with a dotted line.

Figure 15:
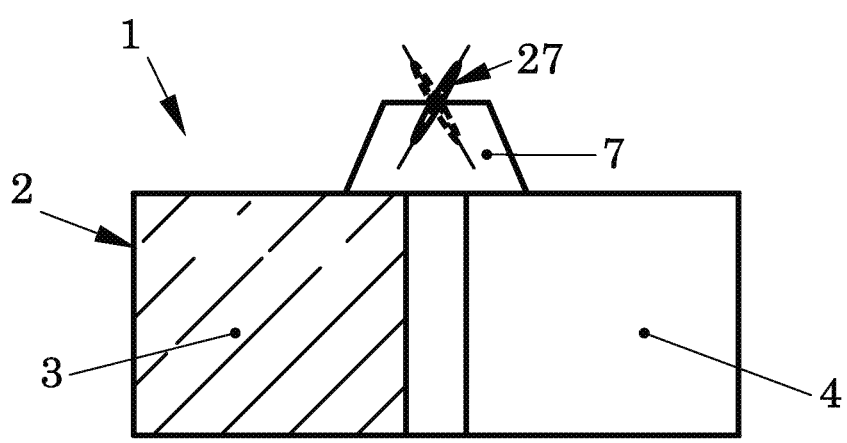
FIG. 15 depicts a reduction in the movement path of the moving friction element in response to a frequency change of the excitation voltage.

When the frequency fu of the excitation voltage provided by the first voltage U1 changes from the mechanical resonance frequency frm to the anti-resonance frequency fa, the movement path 27 of the moving friction element 7 reduces its amplitude, as shown in FIG. 15. In the area of the anti-resonance frequency fa, the circuit of FIG. 11 can be converted in the circuit of the presentation of FIG. 12.

In the area of the anti-resonance frequency fa, the resistance of the mechanical inductance is only partially compensated by the resistance of the mechanical capacitance Cm. At the anti-resonant frequency fa, the current decreases from Iu max to Iu min, with the ratio of Iu max to Iu min being between 100 and 300. That is, at the frequency fa, an inductive resistance of the mechanical inductance Lm connected in series with the resistance Rf is formed which is 100 to 300 times larger than the resistance of the friction contact Rf. This resistance determines the current Im in the frequency range of the anti-resonance fa and stabilizes it and thus the movement velocity Va of the driven element 10.

It follows that when using the method according to the disclosure for controlling the velocity of movement or the position of the driven element 10 of an ultrasonic motor, the oscillations of the resistance of the friction contact Rf practically do not cause any oscillations of the movement velocity Va.

When the frequency fu of the excitation voltage changes from the resonant frequency fr in the direction of the anti-resonance fa at low and extremely low moving velocities Va of the driven element 10, a stabilizing effect for .phi the movement velocity Va is formed. This effect occurs the more strongly the closer the frequency of the fu of the excitation voltage and the anti-resonance frequency fa lie to each other.

Figure 16:
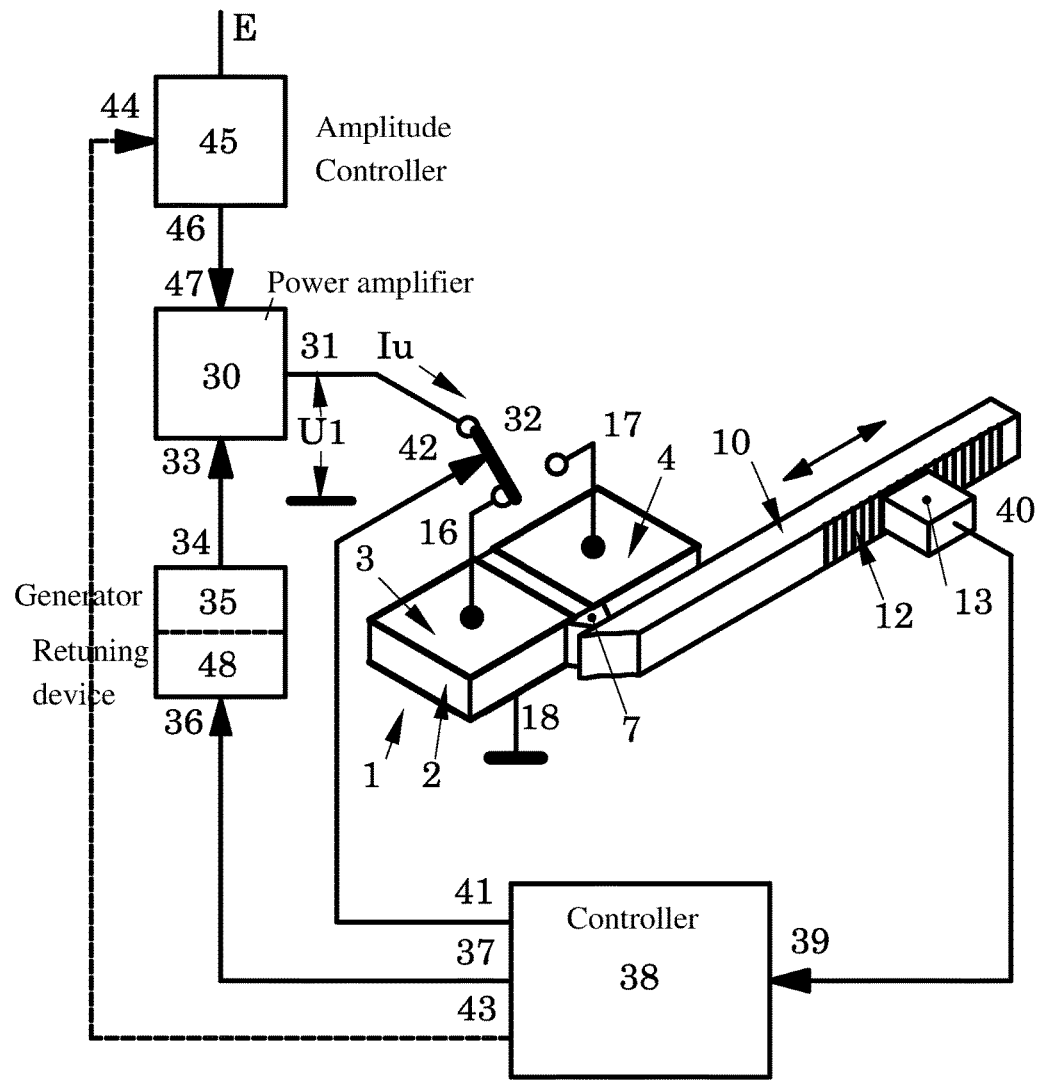
FIG. 16 depicts an electrical block diagram for a control arrangement according to the present disclosure.

FIG. 16 shows the electrical block diagram for a control arrangement according to the disclosure.

The circuit has the power amplifier 30, whose output 31 is connected via the switch 32 to the input 16 or 17 of the ultrasonic actuator 1. The excitation input 33 of the power amplifier 30 is connected to the output 34 of the independent generator 35. The input 36 of the independent generator 35 is connected as a frequency control input to the output 37 of a controller 38 of the driven element 10 designed as a velocity or position controller. The input 39 of the controller 38 is connected to the output 40 of the encoder or position indicator 13 for the velocity of movement or the position of the driven element 10.

The second output 41 of the controller 38 is connected to the input 42 of the changeover switch 32 of the direction of movement of the driven element 10. The third output 43 of the controller 38 may be connected to the control input 44 of the amplitude controller 45 of the excitation voltage whose output 46 is connected to the amplitude control input 47 of the power amplifier 30. The excitation voltage is provided by the first voltage U1.

The independent generator 35 includes a retuning device 48 for the frequency fu of the excitation voltage provided by the first voltage U1. As a control element for the retuning device 48 may serve a controlled phase shifter containing an electrically controlled resistor or an electrically controlled capacitor. Likewise, an electrically controlled digital phase shifter can be used.

The controller 38 may be implemented as a PID controller of the movement velocity or the position of the driven element 10. The switch 32 may be designed as a bipolar transistor, as a field effect transistor or as an optical thyristor. The amplitude controller 45 may be a controllable DC-DC converter for the supply voltage E. As encoder or position sensor 13, a high-precision laser raster encoder can be used. Hereinafter, the control process for the moving velocity of the driven member 10 according to the proposed method will be considered.

First, the independent generator 35 provides a signal whose frequency is equal to or within the mechanical resonance frequency frm of the ultrasonic actuator 1. This signal is applied to the input 33 of the power amplifier 30, which provides the first voltage U1 as an excitation voltage with the mechanical resonance frequency frm. The driven element 10 of the ultrasonic motor begins to move at the maximum velocity Va max. The position sensor 13 begins to generate a signal which is applied to the input 39 of the controller 38. Subsequently, the controller 38 provides a signal that increases the frequency fu. This reduces the velocity of movement of the driven element 10, whereby the signal of the position sensor 13 changes. The frequency fu increases until the target velocity for the driven element 10 is reached.

When falling below the target velocity of the driven element, the controller 38 generates at its output 41 a signal which reduces the frequency fu. This increases the moving velocity of the driven element 10. A process for maintaining the moving velocity of the driven member 10 around the target value starts. In addition, the smaller the target velocity of the driven element 10, the smaller the instability or lack of constancy of the target velocity due to the reasons described above.

It may be advantageous if, in order to achieve the target values of the movement velocity of the driven element 10, an additional amplitude controller 45 is used which controls the voltage amplitude.

In this case, the frequency control fu is interrupted when the target velocity is reached. Thereafter, the velocity control is carried out with the aid of the amplitude controller 45 of the excitation voltage provided by the first voltage U1. In the position control of the driven element 10, the driven element 10 begins to move initially at maximum velocity in the direction of the target position. Upon reaching the target position and passing through this, the encoder or position sensor 13 generates a switching signal for the switch 32, whereby the direction of movement of the driven element changes in the predetermined direction. It begins a process for maintaining the driven member 10 in the predetermined position. The following applies: the higher the stability of the velocity of movement of the driven element 10, the more accurately the driven element 10 is guided into the target position.

In some applications, to achieve the target position of the driven element 10, an additional amplitude controller 45 may be used which controls the amplitude of the first voltage U1. In this case, the control of the frequency fu is interrupted upon reaching the target position of the driven element 10, and the further position adjustment is carried out with the amplitude controller 45 of the first voltage U1 as the excitation voltage.

Figure 17:
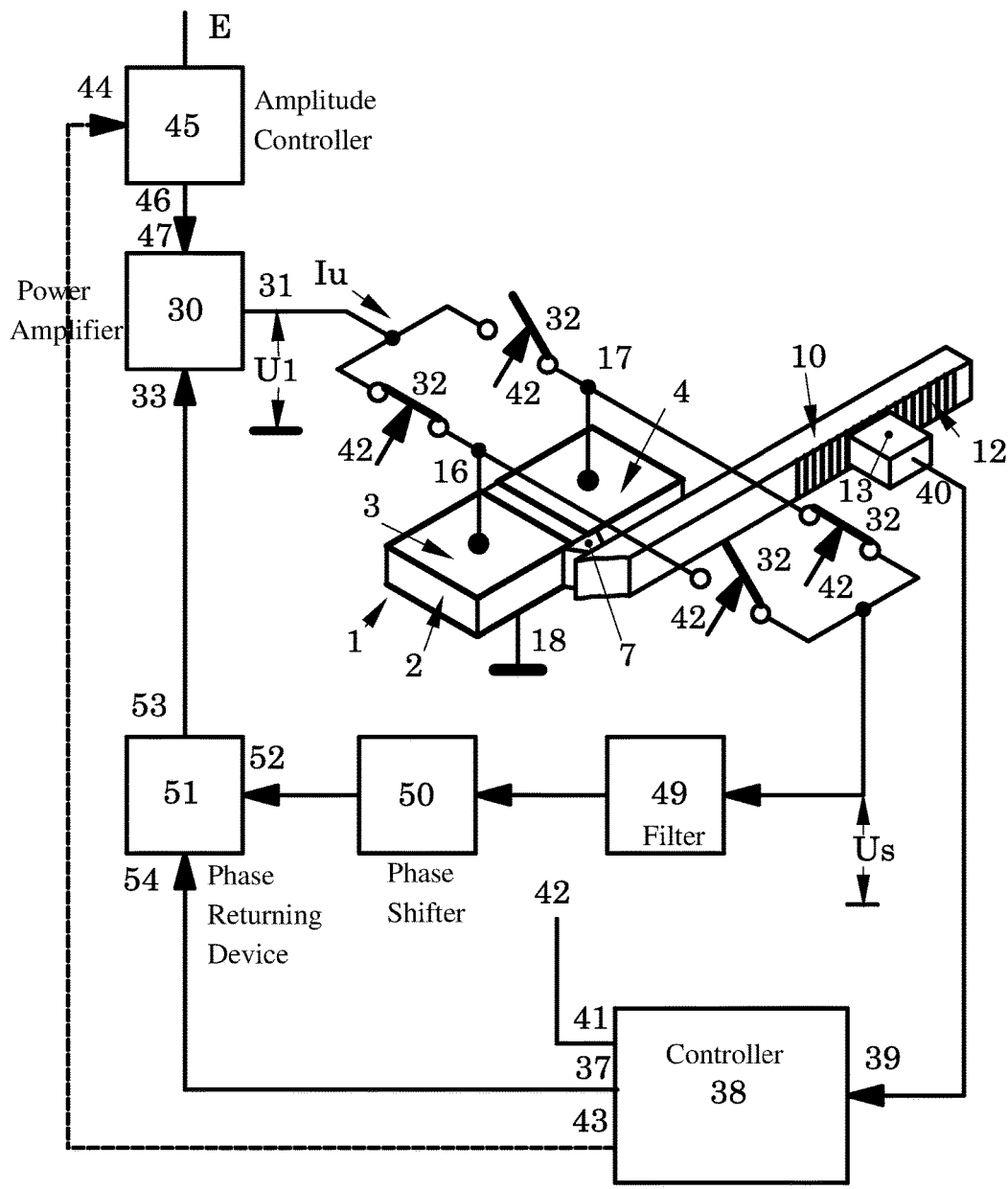
FIG. 17 depicts a block diagram for an additional embodiment of a control scheme.

FIG. 17 shows the block diagram for a further embodiment of a control arrangement according to the disclosure.

The circuit has a self-exciting oscillator for the electrical first voltage U1 as the excitation voltage, in which the frequency fu for the electrical first voltage U1 which drives the electric actuator is set by means of the self-exciting oscillator whose frequency control element represents an encoder for the mechanical deformation of the ultrasonic actuator 1. In this embodiment, this encoder is constituted by the second (or first) generator 2 (or 3) for acoustic waves which is not electrically excited. Moreover, the additional electrode or the additional piezoelectric element which is arranged on the ultrasonic actuator 1 can serve as such encoder.

The circuit comprises a feedback circuit which includes a filter 49, a phase shifter 50 and a phase retuning device 51 with the excited input 52, the output 53 and the control input 54. The circuit is based on the principle of self-excitation of the circuit on the mechanical resonance frequency frm. The principle is explained in more detail below.

Figure 18:
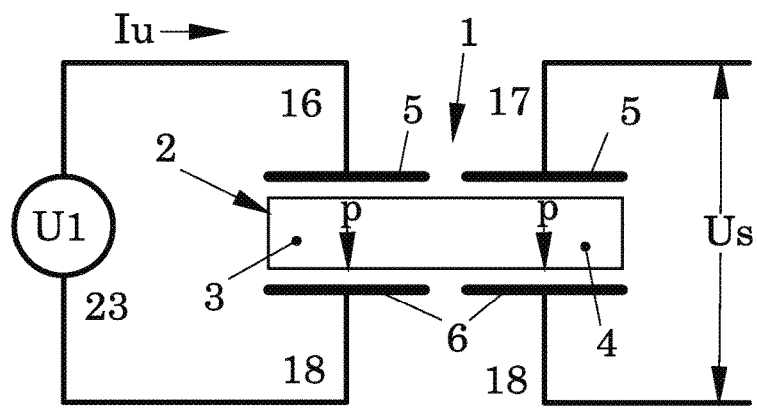
FIG. 18 discloses a schematic circuit diagram for connecting an ultrasonic generator to an excitation device.

FIG. 18 shows a schematic circuit diagram for connecting the ultrasonic actuator 1 to the excitation device 23. When the first generator 3 is stimulated, the voltage Us is generated at the excitation electrodes 5 or the general electrodes 6 of the electrically not stimulated second generator 4.

Figure 19:
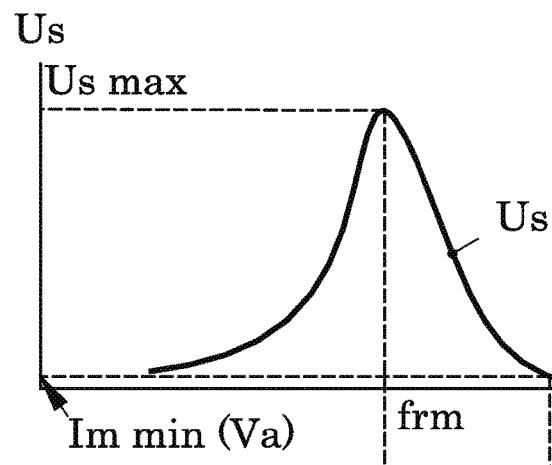
FIG. 19 depicts frequency dependence of an excitation voltage and FIG. 20 depicts dependence of phase shift between voltages for direct and inverse connections.
Figure 20:
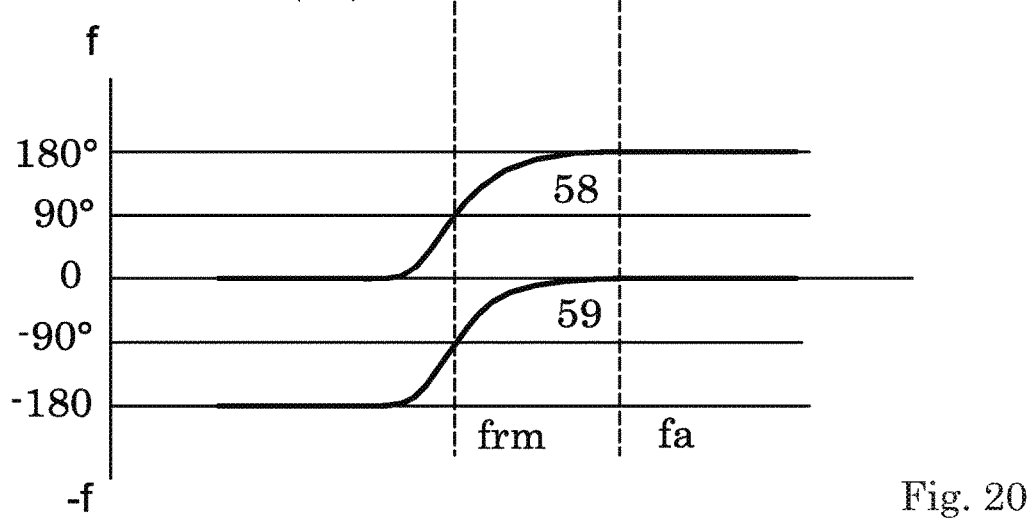

FIG. 19 shows the frequency dependence of the voltage Us, while FIG. 20 shows the dependence of the phase shift φ between the first voltage U1 and the voltage Us at direct (curve 58) and inverse connection (curve 59) of the electrodes 5, 6.

The voltage Us is applied to the input 33 of the power amplifier 30 via the filter 49, the phase shifter 50 and the phase adjuster 51.

The filter 49 blocks the high harmonics of the voltage Us. The phase shifter for the mechanical resonance frequency frm rotates the phase of the voltage Us from plus to minus 90 degrees. The phase adjuster 51 can shift the phase of the voltage Us to plus or minus 90 degrees. The phase adjustment takes place with the aid of the signal at the input 54 of the phase retuning device 51.

The circuit is tuned so that at the mechanical resonance frequency frm the phase shift in the feedback loop equals zero and the gain coefficient is greater than one. Under these conditions, the circuit oscillates independently on the mechanical resonance frequency frm.

By changing the phase shift by means of the phase retuning device 51, the excitation frequency of the circuit can be changed from the mechanical resonance frequency frm to the resonance frequency fa. Thereby, it is possible to control the movement velocity Va or the positioning of the ultrasonic motor as shown in the previous case.

Figure 21:
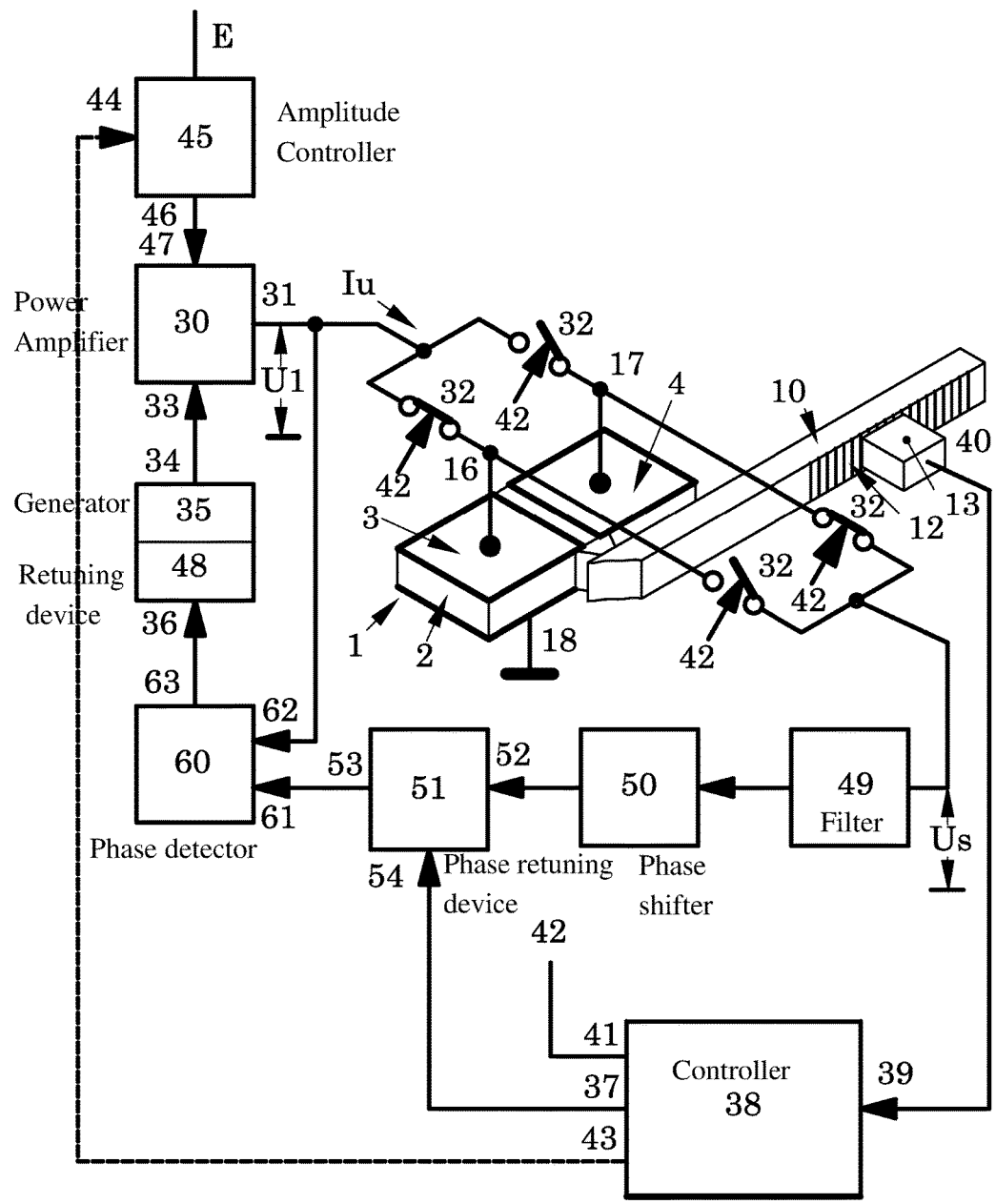
FIG. 21 depicts an additional embodiment of a control arrangement according to the present disclosure.

FIG. 21 shows the block diagram of a further embodiment of the control arrangement according to the disclosure with a phase detector 60 with a first input as measurement input 61, a second input as reference input 62 and the output 63. The phase detector 60 measures the phase shift angle φ between the first voltage U1 and the voltage Us and provides an error signal which adjusts the frequency of the independent generator 35. The adjustment of the frequency of the independent generator 35 can be done on the principle of proportional adjustment. By retuning the phase shift angle in the feedback loop, the movement velocity or position of the driven member 10 can be controlled by the phase retuning device 51.

Figure 22:
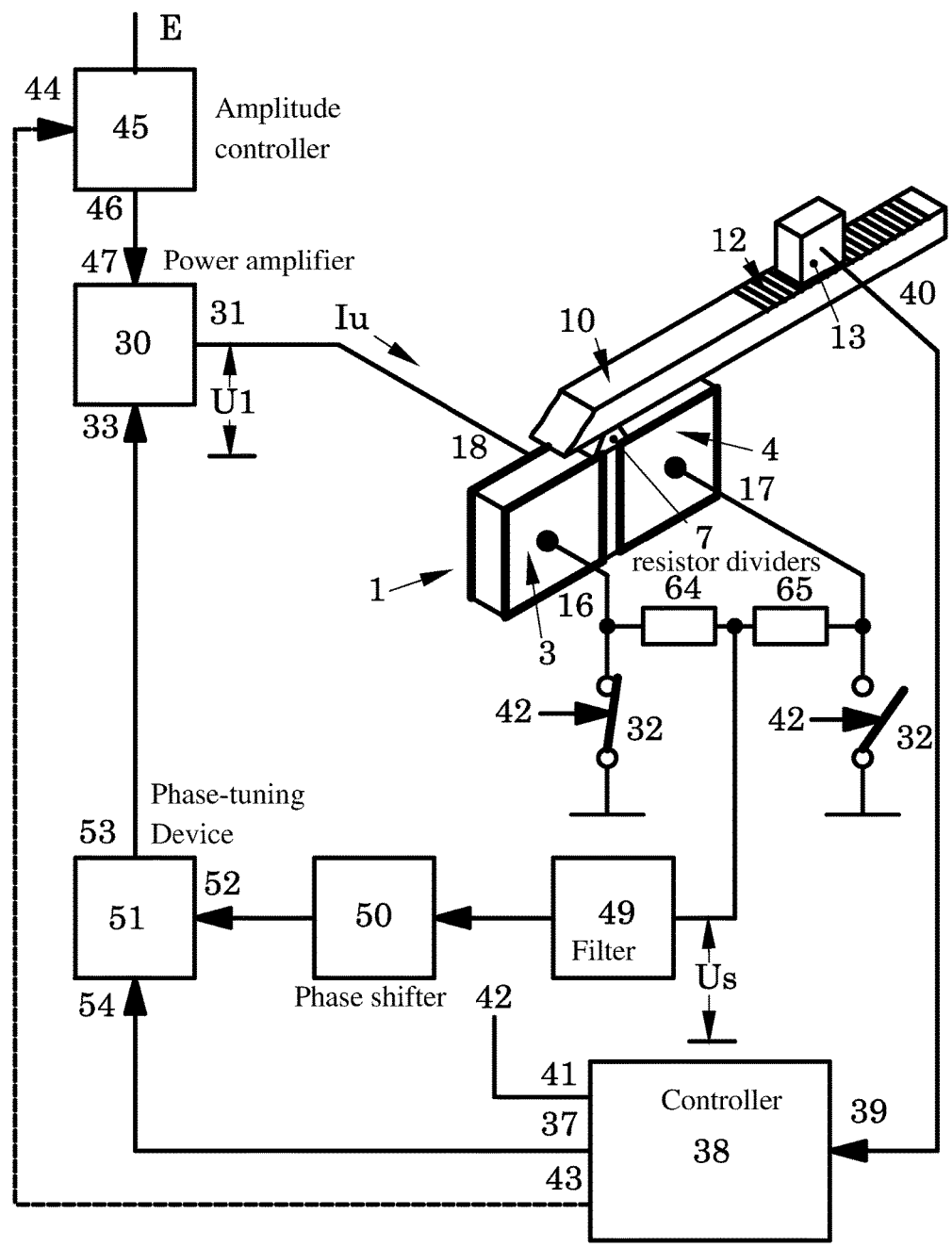
FIGS. 22-24 depict further embodiments of control arrangements according the present disclosure.

FIG. 22 shows the block diagram of a further embodiment of the control arrangement according to the disclosure, in which the voltage Us generated by the second (or first) generator 4 (or 3) is applied via the resistor divider 64, 65 to the filter 49 of the feedback circuit. This type of arrangement operates in analogy to the arrangement shown in FIG. 17 as a self-exciting oscillator.

Figure 23:
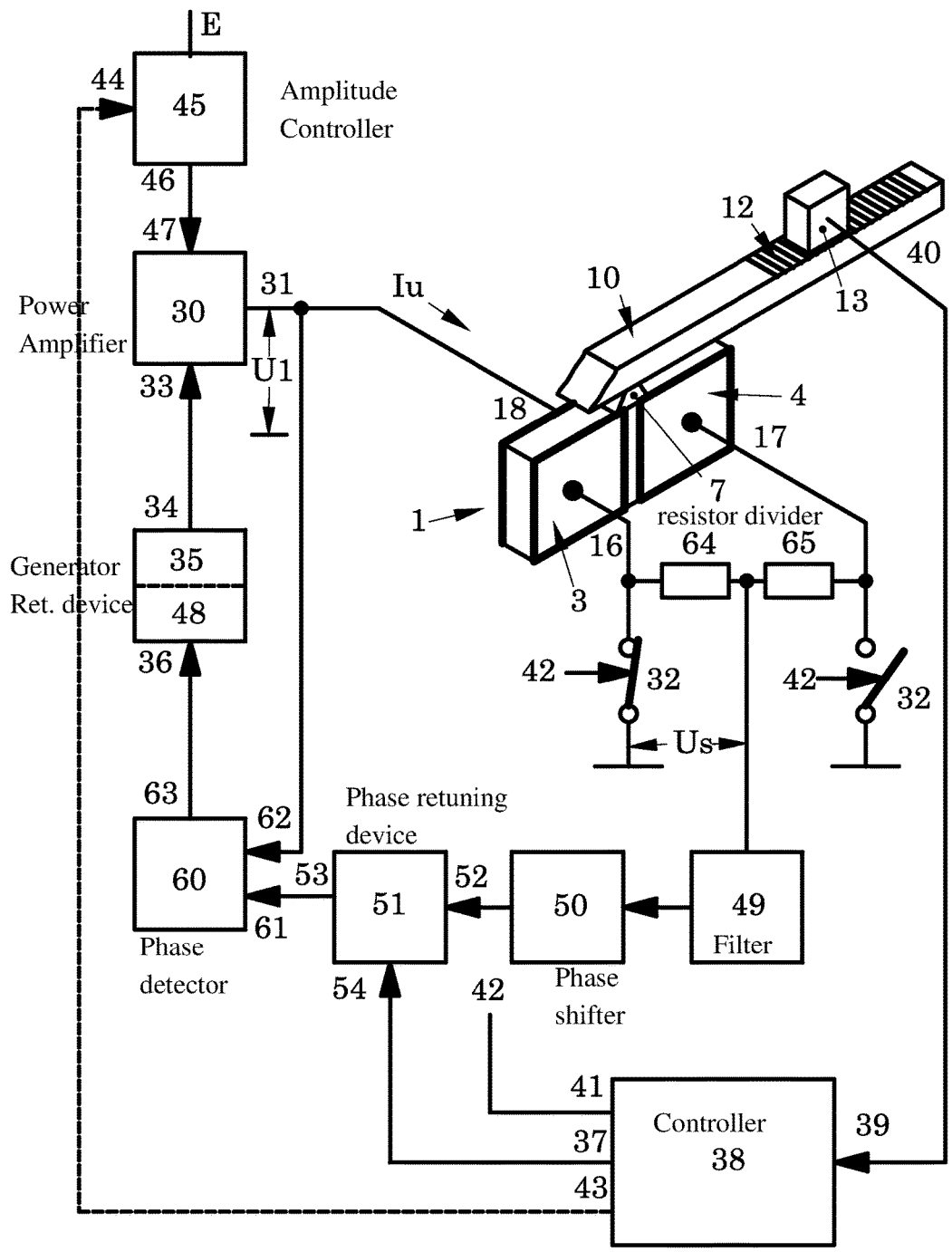

FIG. 23 shows the block diagram of a further embodiment of the control arrangement according to the disclosure with the resistor divider 64, 65 and with the phase detector 60. The arrangement works analogously to the control arrangement shown in FIG. 21.

Figure 24:
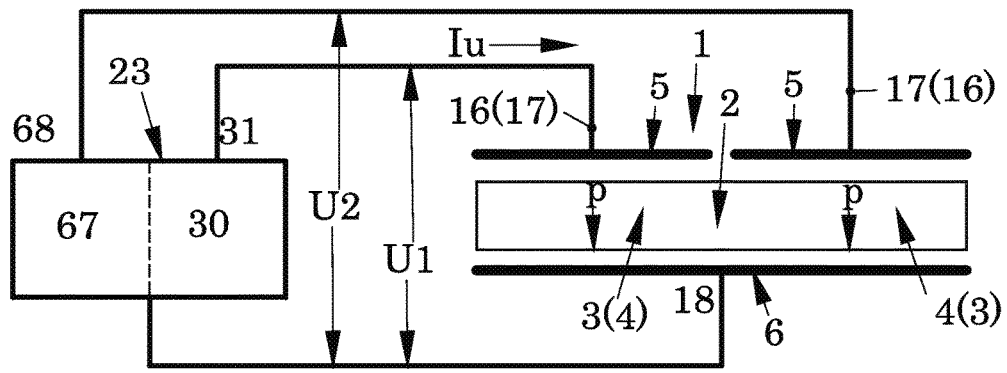

The method according to the disclosure and the control arrangement according to the disclosure also provides a two-phase excitation of the ultrasonic actuator 1. In this case, the excitation device 23 provides a two-phase electrical voltage of equal frequency fu (see FIG. 24) with the first and second voltages U1 and U2 as excitation voltages and with a phase shift of 90 degrees between them or another displacement angle. For this purpose, the excitation device 23 additionally comprises an additional power amplifier 67 with the input 68. The voltage U2 is applied to the second (or first) generator 4 (or 3).

Figure 25:
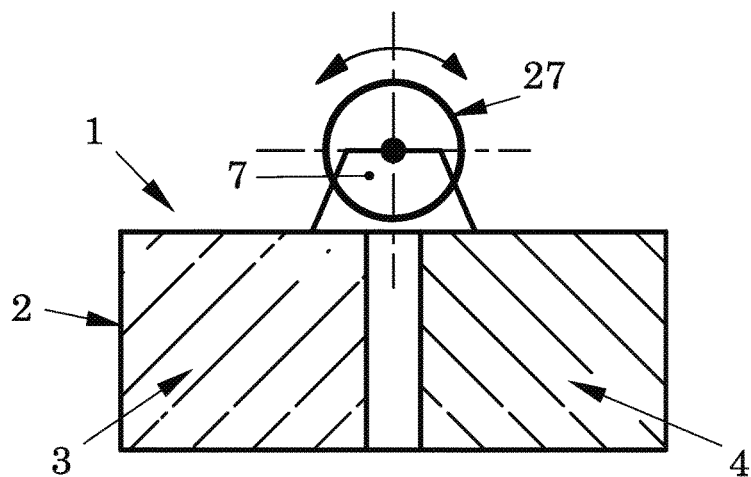
FIGS. 25 and 26 depict movement of the friction element of the ultrasonic actuator with phase shifts, FIG. 25 depicting a circular path and FIG. 26 depicting elliptical trajectories.
Figure 26:
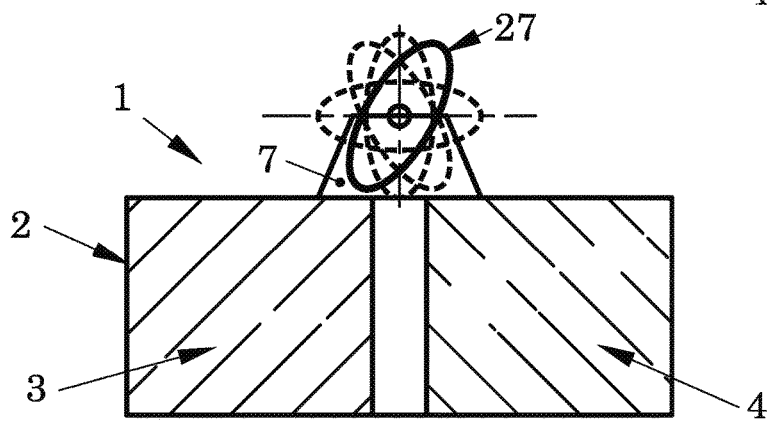

With a phase shift of +/−90 degrees between the first and second voltages U1, U2 and the same amplitude of the first and second voltages U1, U2, the friction element 7 of the ultrasonic actuator 1 moves on a circular path of movement 27 in a direction which is shown in FIG. 25 by means of arrows or in another direction. When changing the phase shift angle to a value which is greater or less than 90 degrees or when changing one of the amplitudes of the first and second voltages U1, U2, the friction element 7 moves on elliptical trajectories, as shown in FIG. 26.

Figure 27:
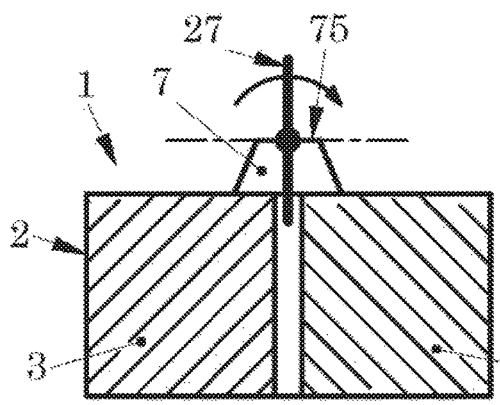
FIGS. 27-30 depict movement of the friction element 7 in response to imposition of different voltage amplitudes and phase shifts.
Figure 29:
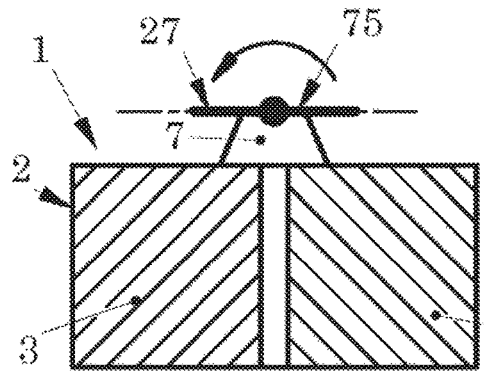

FIGS. 27 and 29 illustrate two limiting cases for the movement of the friction element 7.

In the first case, the phase shift angle between the first and second voltages U1, U2 is zero and the amplitude of the first voltage U1 is equal to that of the second voltage U2. In this case, the movement path 27 is a straight line directed perpendicular to the friction surface 75 of the friction element 7 (FIG. 27).

Figure 28:
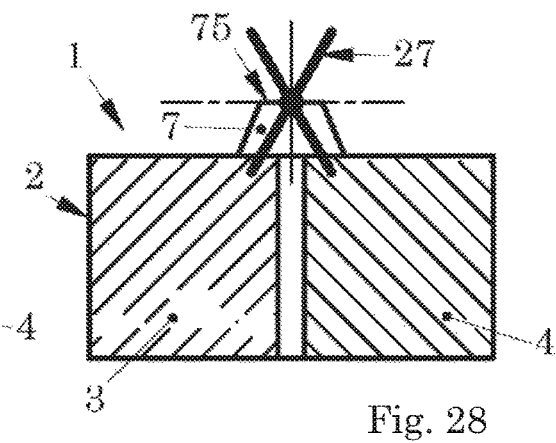

When reducing the amplitude of one of the first or second voltage U1, U2, in each case relative to the amplitude of the other voltage, the movement path 27 is inclined relative to the friction surface 75, as shown in FIG. 28.

In the second case, the phase shift angle between the first and second voltages U1, U2 is zero and the amplitude of the first voltage U1 is equal to that of the second voltage U2.

Figure 30:
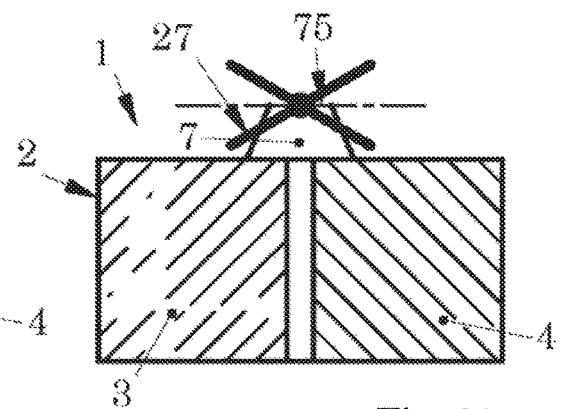

In this case, the movement path 27 is a straight line running parallel to the friction surface 75 of the friction element 7 (FIG. 29). When reducing the amplitude of one of the first or the second voltage U1, U2, in each case relative to the amplitude of the other voltage, the movement path 27 is reversed in relation to the friction surface 75, as shown in FIG. 30.

By using one of the limiting cases of the movement of the friction member 7, it is possible to increase the stability of the moving velocity of the driven member 10 at extremely low velocities.

Figure 31:
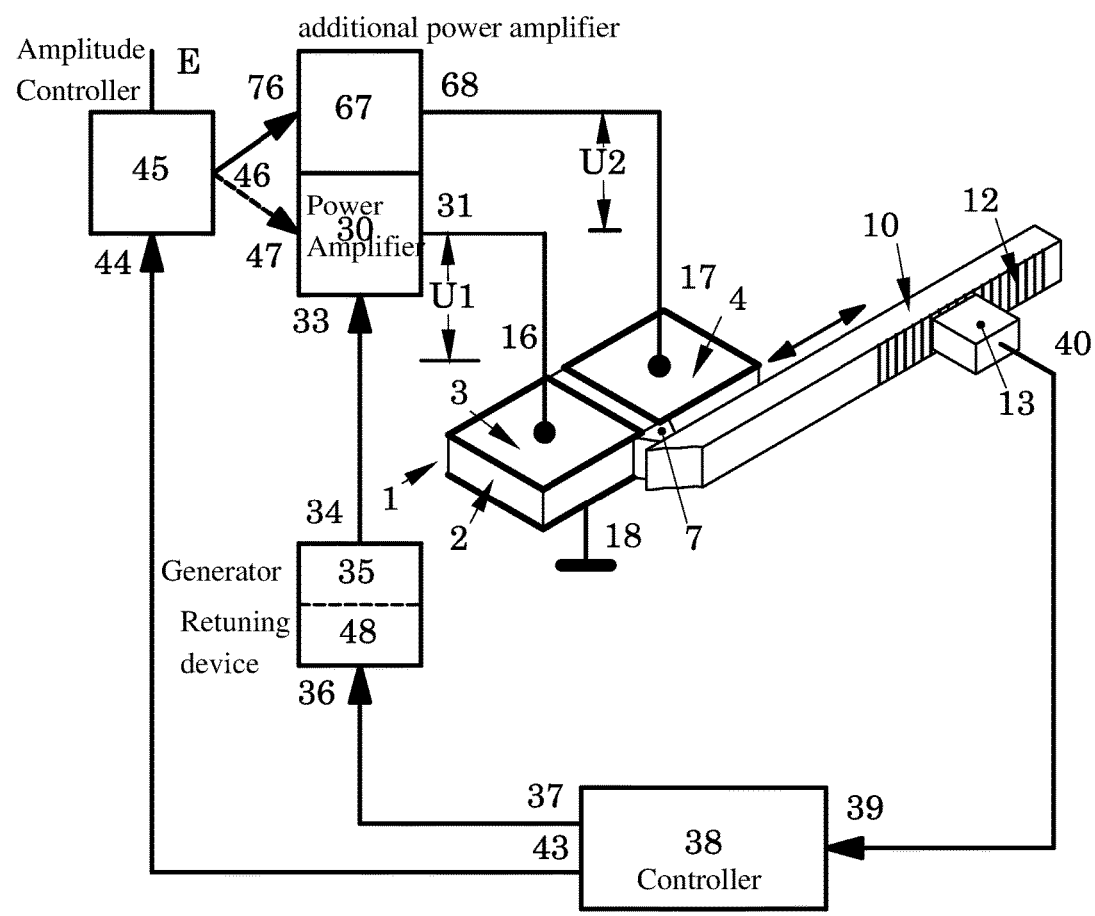
FIGS. 31-33 depict block diagrams of additional control scheme embodiments.

FIG. 31 shows the block diagram for a further embodiment of the control arrangement according to the disclosure for an ultrasonic motor with a two-phase excitation of the ultrasonic actuator 1 which uses the method according to the disclosure.

The circuit comprises the independent generator 35, the power amplifier 30 as the main power amplifier and the auxiliary power amplifier 67. The circuit operates analogously to the circuit shown in FIG. 16.

Figure 32:
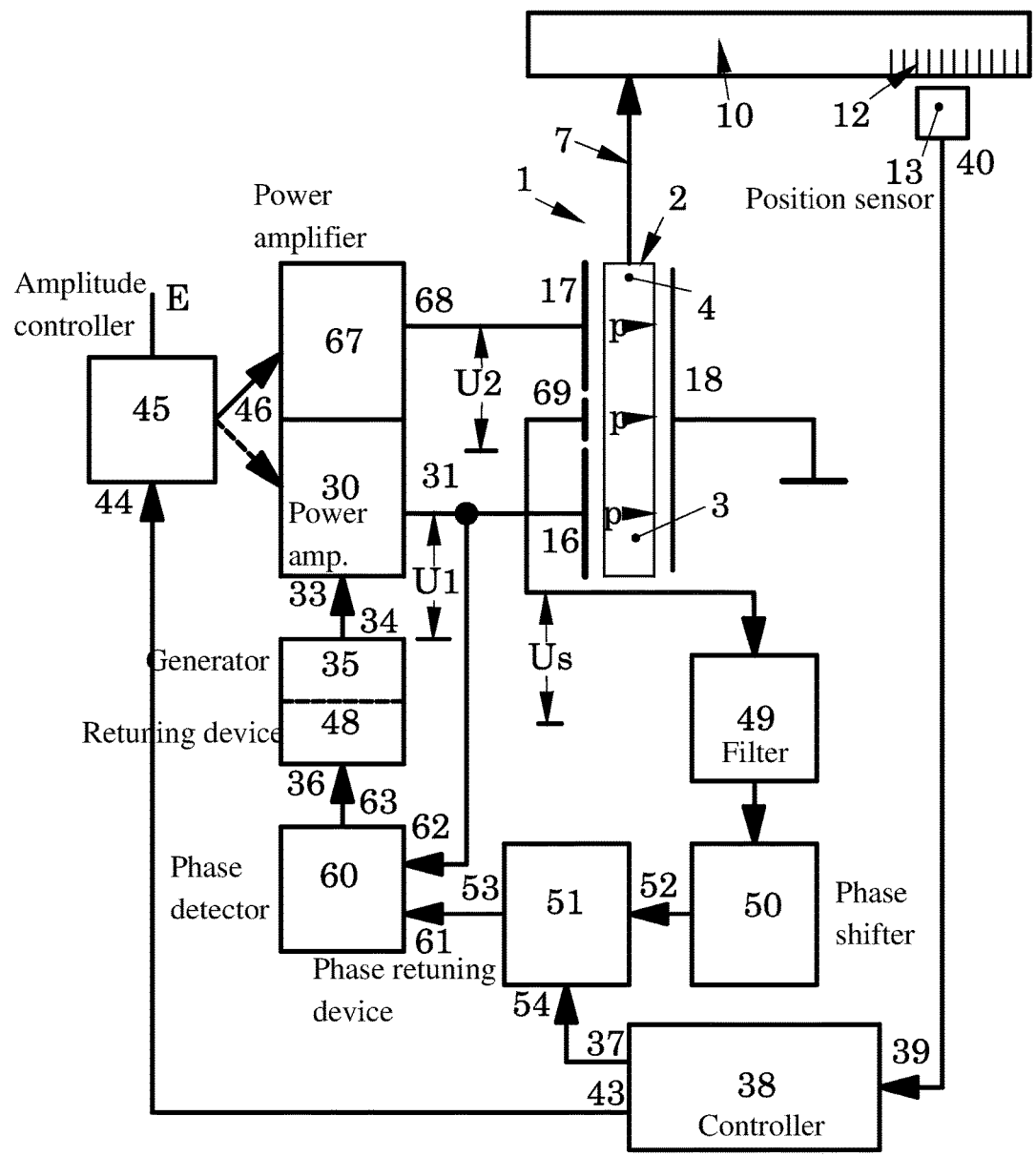

FIG. 32 shows the block diagram of a further embodiment of the control arrangement according to the disclosure for an ultrasonic motor with a two-phase excitation, in which the voltage Us is generated as a feedback voltage by the additional electrode 69. The circuit operates analogously to the circuit shown in FIG. 23.

Figure 33:
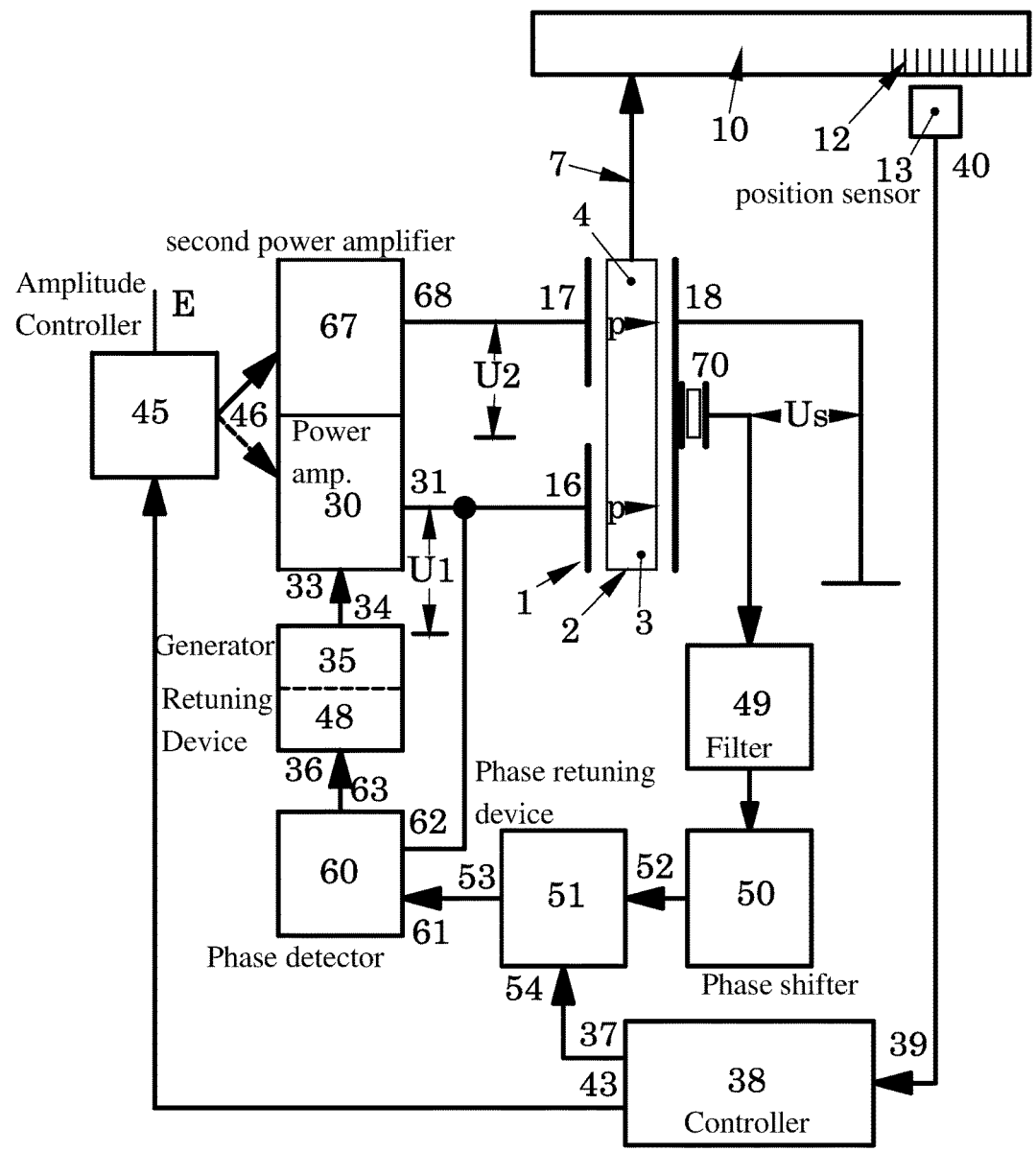

FIG. 33 shows the block diagram of a further embodiment of the control arrangement according to the disclosure for an ultrasonic motor with a two-phase excitation, in which the voltage Us is generated as a feedback voltage by an additional piezoelectric element 70. The circuit operates analogously to the circuit shown in FIG. 23.

The proposed control method for the ultrasonic motor and the proposed control arrangement make it possible to easily increase the stability of the velocity of the driven member 10 of the ultrasonic motor at low and extremely low movement velocities. In addition, the positioning accuracy of the driven member 10 of the ultrasonic motor is improved at low and extremely low moving velocities.

Moreover, the proposed method and arrangement make it possible to simplify the manufacturing technology for ultrasonic motors, which makes these motors and the systems in which the motors are used cheaper.

| | Reference numerals |
|---|---|
| 1 | ultrasonic actor |
| 2 | piezoelectric plate |
| 3 | first generator for acoustic waves |
| 4 | second generator for acoustic waves |
| 5 | excitation electrodes |
| 5a | first excitation electrode |
| 5b | second excitation electrode |
| 6 | common electrode |
| 7 | friction element |
| 8 | biasing device |
| 9 | friction layer |
| 10 | driven element |
| 10a | drive surface |
| 10g | base body |
| 11 | guide device |
| 12 | measurement scale |
| 13 | position (attitude) sensor |
| 16 | output of the first excitation electrode |
| 17 | output of the second excitation electrode |
| 18 | output of the general excitation electrode |
| 23 | excitation device |
| 27 | movement path |
| 30 | power amplifier |
| 31 | output of the power amplifier |
| 32 | changeover switch |
| 33 | excitation input |
| 34 | output of the independent generator |
| 35 | independent generator |
| 36 | input of the independent generator |
| 37 | output of the controller |
| 38 | controller |
| 39 | input of the controller |
| 40 | output of the controller |
| 41 | second output of the controller |
| 42 | input of the changeover switch |
| 43 | third output of the controller |
| 44 | control input of the amplitude controller |
| 45 | amplitude controller |
| 46 | output of the amplitude controller |
| 47 | amplitude control input |
| 48 | retuning device |
| 49 | filter |
| 50 | phase shifter |
| 51 | phase retuning device |
| 52 | input of the phase retuning device |
| 53 | output of the phase retuning device |
| 54 | control input of the phase retuning device |
| 58 | curve |
| 59 | curve |
| 60 | phase detector |
| 61 | measurement input of the phase detector |
| 62 | reference input of the phase detector |
| 63 | output of the phase detector |
| 64, 65 | resistor divider |
| 67 | additional power amplifier |
| 68 | input of the additional power amplifier |
| 69 | additional electrode |
| 70 | additional piezoelectric element |
| 75 | friction surface |
| B | actuation layer |
| B1 | first longitudinal side surface |
| B2 | longitudinal side surface |
| Co | electrical capacitance |
| Cm | mechanical capacity |
| E | sensor device/measurement device |
| fa | electrical anti-resonance frequency |
| fe | electrical resonance frequency |
| fr | resonance frequency |
| frm | mechanical resonance frequency |

-continued

| Reference numerals | |
|---|---|
| fu | frequency of the electrical excitation voltage |
| Iu | current through the actuator |
| Iu max | maximum of Iu |
| Iu min | minimum of Iu |
| Im | current through the mechanical part of the actuator |
| Im max | maximum von Im |
| K | core layer |
| L1 | longitudinal direction |
| Lm | mechanical inductance |
| M | ultrasonic motor |
| p | polarization |
| Rm | mechanical loss resistance in the actuator |
| Rf | mechanical resistance of the friction contact |
| U1 | first voltage |
| U2 | second voltage |
| Us | voltage |
| Va | movement velocity of the driven element |
| Va max | maximum velocity Va of the driven element |
| φ | phase shift |

The invention claimed is:

1. A method for controlling a velocity of movement or a position of a driven element of an ultrasonic motor from a first adjustment state which is defined by at least one of a starting velocity or a starting position of the driven element into a second adjustment state which is defined by one or both of the end velocity of the driven element or the end position of the driven element, the ultrasonic motor comprising an ultrasonic actuator with at least a first and a second acoustic wave generator, wherein one of the generators or both generators are subjected to an electrical excitation voltage, the method comprising the steps of:
   starting from the first adjustment state of the driven element adjusting a frequency of the electrical excitation voltage such that it is equal to or close to a mechanical resonance frequency of the ultrasonic actuator;
   changing the frequency of the electrical excitation voltage using the signal of at least one of the velocity sensor or the position sensor towards an anti-resonance frequency of the ultrasonic actuator until the second adjustment state is reached;
   controlling the end velocity or the end position of the driven element with a predetermined accuracy by means of an antiphase frequency change.

2. The method according to claim 1, wherein in addition, when the final velocity or the end position of the driven element is reached, the velocity or position of the driven element is controlled or by means of an amplitude controller a voltage is adjusted which excites one of the generators for acoustic waves.

3. The method according to claim 1, wherein the frequency of the electrical excitation voltage is given by an independent electric generator.

4. The method according to claim 1, wherein the frequency of the electrical excitation voltage is generated with a self-exciting oscillator whose frequency-giving element constitutes a generator for a mechanical deformation of the ultrasonic actuator.

5. The method according to claim 4, wherein the change in the frequency of the electrical excitation voltage is effected by influencing a magnitude of a phase shift within a phase shifter element of the self-exciting oscillator.

6. The method according to claim 4, wherein the self-exciting oscillator operates on a principle of frequency proportional control.

7. The method according to claim 1, wherein a controller for at least one of the velocity or the position of the driven element operates on a principle of PID frequency control.

8. The method according to claim 4, wherein as a signal used by the generator for the mechanical deformation of the ultrasonic actuator, a voltage is used which is generated by an electrically non-excited first or second acoustic wave generator or by an additional electrode which is disposed at the ultrasonic actuator or by an additional piezoelectric element which is disposed at the ultrasonic actuator.

9. The method according to claim 1, wherein an electrical excitation voltage of the same frequency is applied to each of the first and second acoustic wave generators.

10. The method according to claim 9, wherein between the excitation voltages applied to the generators there is a phase shift of any angle in the range of zero to +/−180°.

11. The method according to claim 9, wherein an amplitude of the excitation voltage applied to one of the acoustic wave generators is controlled by an amplitude controller.

12. The method according to claim 9, wherein changing the frequency comprises a change of the frequency of the first voltage in a direction in which the total current of the ultrasonic actuator decreases until reaching the second adjustment state of the driven element; and
   wherein after determining that the driven element has reached the second adjustment state, the second adjustment state of the driven element is maintained in a stable condition by a control loop in which a detected deviation of the current setting state from the second adjustment state is reduced by changing one or both of the following measures:
      changing the frequency of the first voltage relative to the frequency of the second voltage; and
      changing the amplitude of the first voltage relative to the amplitude of the second voltage.

13. A control arrangement for an ultrasonic motor, the ultrasonic motor comprising an ultrasonic actuator with at least a first and a second acoustic wave generator, a driven element and an independent generator for an electrical excitation voltage, wherein the independent generator for an electrical excitation voltage comprises a frequency adjustment, wherein an output of the independent generator is connected to a power amplifier and an input of the independent generator is connected to a controller for a movement velocity or for a position of the driven element,
   wherein the control arrangement, when starting from a first adjustment state of the driven element, is configured to adjust the frequency of the electrical excitation voltage such that it is equal to or close to a mechanical resonance frequency of the ultrasonic actuator, and is further configured to thereupon change the frequency of the electrical excitation voltage using the signal of at least one of a velocity sensor or a position sensor towards an anti-resonance frequency of the ultrasonic actuator until a second adjustment state is reached;
   wherein the first adjustment state is defined by at least one of a starting velocity or a starting position of the driven element and the second adjustment state is defined by at least one of an end velocity or an end position of the driven element.

14. The control arrangement for an ultrasonic motor according to claim 13, wherein the control arrangement further comprises an amplitude controller of the electrical excitation voltage, the input of which is connected to controller for the movement velocity or the position of the driven element.

15. The control arrangement for an ultrasonic motor according to claim 13, wherein the control arrangement comprises a phase detector whose first input is connected to a generator for mechanical deformations of the ultrasonic actuator and whose second input is connected to the output of the power amplifier.

16. The control arrangement according to claim 15, wherein as generator for the deformation of the ultrasonic actuator an electrically non-excited first or second generator for acoustic waves or an additional electrode or a piezoelectric element which is arranged on the ultrasonic actuator is used.

17. The control arrangement according to claim 13, wherein for frequency adjustment a controlled phase shifter is used which comprises an electrically controlled resistor, an electrically controlled capacitor or an electrically controlled digital phase shifter.

\* \* \* \* \*